(12) United States Patent
Brown et al.

(10) Patent No.: US 8,145,180 B2
(45) Date of Patent: Mar. 27, 2012

(54) POWER GENERATION FOR PROCESS DEVICES

(75) Inventors: Gregory C. Brown, Chanhassen, MN (US); Andrew J. Klosinski, Chaska, MN (US); Steven R. Trimble, Prior Lake, MN (US); Mark Fandrey, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 716 days.

(21) Appl. No.: 11/236,317

(22) Filed: Sep. 27, 2005

(65) Prior Publication Data

US 2006/0116102 A1 Jun. 1, 2006

Related U.S. Application Data

(63) Continuation-in-part of application No. 10/850,828, filed on May 21, 2004.

(51) Int. Cl.
*H04B 1/16* (2006.01)
*G05B 11/01* (2006.01)
*G06F 1/00* (2006.01)
*H01M 10/44* (2006.01)

(52) U.S. Cl. ........ 455/343.1; 700/11; 713/300; 320/101

(58) Field of Classification Search .................. 320/101; 700/17; 290/44; 713/300; 455/343.1
See application file for complete search history.

(56) References Cited

U.S. PATENT DOCUMENTS

| | | | |
|---|---|---|---|
| 2,533,339 A | 12/1950 | Willenborg | 177/311 |
| 2,883,489 A | 4/1959 | Eadie, Jr. et al. | 335/148 |
| 3,012,432 A | 12/1961 | Moore et al. | 73/40 |
| 3,218,863 A | 11/1965 | Calvert | 73/398 |
| 3,229,759 A | 1/1966 | Grover et al. | 165/105 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,568,762 A | 3/1971 | Harbaugh | 165/105 |
| 3,612,851 A | 10/1971 | Fowler | 362/30 |
| 3,631,264 A | 12/1971 | Morgan | 327/309 |
| 3,633,053 A | 1/1972 | Peters | 310/15 |
| 3,697,835 A | 10/1972 | Satori | 317/246 |

(Continued)

FOREIGN PATENT DOCUMENTS

CH 672 368 A5 11/1989

(Continued)

OTHER PUBLICATIONS

Zahnd et al., Piezoelectric Windmill: A Novel Solution to Remote Sensing, Japanese Journal of Applied Physics, published Dec. 24, 2004.*
Zahnd et al., Piezoelectric Windmill, A Novel Solution to Remote sensing, Japanese Journal of Applied Physics, Dec. 24, 2004.*
St Pierre et al., Fuel Cells: a New, Efficient and Cleaner Power Source, AIChE Journal, Jul. 2001.*

(Continued)

*Primary Examiner* — Albert DeCady
*Assistant Examiner* — Darrin Dunn
(74) *Attorney, Agent, or Firm* — Christopher R. Christenson; Westman, Champlin & Kelly, P.A.

(57) ABSTRACT

A process device includes a controller and a wireless communications module. The wireless communications module is coupled to the controller. A power generation module is provided to generate electricity for the process device. The power generator module can be disposed within the process device or it can be a separate unit coupled to the process device.

9 Claims, 11 Drawing Sheets

U.S. PATENT DOCUMENTS

| | | | |
|---|---|---|---|
| D225,743 S | 1/1973 | Seltzer | D10/102 |
| 3,742,450 A | 6/1973 | Weller | 375/257 |
| 3,808,480 A | 4/1974 | Johnston | 317/256 |
| 3,881,962 A | 5/1975 | Rubinstein | 136/209 |
| 3,885,432 A | 5/1975 | Herzl | 73/861.22 |
| 3,924,219 A | 12/1975 | Braun | 338/34 |
| 3,931,532 A | 1/1976 | Byrd | 310/4 |
| 4,005,319 A | 1/1977 | Nilsson et al. | 310/8.3 |
| 4,008,619 A | 2/1977 | Alcaide et al. | 73/398 |
| 4,042,757 A | 8/1977 | Jones | 429/104 |
| 4,063,349 A | 12/1977 | Passler et al. | 29/627 |
| 4,084,155 A | 4/1978 | Herzl et al. | 340/870.39 |
| 4,116,060 A | 9/1978 | Frederick | 73/861.22 |
| 4,125,122 A | 11/1978 | Stachurski | 136/205 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,287,553 A | 9/1981 | Braunlich | 361/283 |
| 4,297,076 A * | 10/1981 | Donham et al. | 416/37 |
| 4,322,724 A | 3/1982 | Grudzinski | 340/595 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,361,045 A | 11/1982 | Iwasaki | 73/654 |
| 4,370,890 A | 2/1983 | Frick | 73/718 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,475,047 A | 10/1984 | Ebert, Jr. | 307/66 |
| 4,476,853 A | 10/1984 | Arbogast | 126/578 |
| 4,485,670 A | 12/1984 | Camarda et al. | 73/179 |
| 4,490,773 A | 12/1984 | Moffatt | 361/283 |
| 4,510,400 A | 4/1985 | Kiteley | 307/66 |
| 4,542,436 A | 9/1985 | Carusillo | 361/283 |
| 4,562,742 A | 1/1986 | Bell | 73/718 |
| 4,570,217 A | 2/1986 | Allen et al. | 700/19 |
| 4,590,466 A | 5/1986 | Wiklund et al. | 340/870.28 |
| 4,637,020 A * | 1/1987 | Schinabeck | 714/736 |
| 4,639,542 A | 1/1987 | Bass et al. | 136/210 |
| 4,670,733 A | 6/1987 | Bell | 338/36 |
| 4,701,938 A | 10/1987 | Bell | 375/257 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A | 1/1991 | Gross | 377/6 |
| 5,009,311 A | 4/1991 | Schenk | 206/332 |
| 5,014,176 A | 5/1991 | Kelleher et al. | 363/26 |
| 5,023,746 A | 6/1991 | Epstein | 361/56 |
| 5,025,202 A | 6/1991 | Ishii et al. | 320/32 |
| 5,060,295 A | 10/1991 | Borras et al. | 455/186 |
| 5,094,109 A | 3/1992 | Dean et al. | 73/718 |
| D331,370 S | 12/1992 | Williams | D10/46 |
| 5,168,419 A | 12/1992 | Delatorre | 361/283 |
| 5,170,671 A | 12/1992 | Miau et al. | 73/861.22 |
| 5,194,819 A | 3/1993 | Briefer | 73/718 |
| 5,223,763 A | 6/1993 | Chang | 310/339 |
| 5,230,250 A | 7/1993 | Delatorre | 73/733 |
| 5,233,875 A | 8/1993 | Obermeier et al. | 73/718 |
| D345,107 S | 3/1994 | Williams | D10/46 |
| 5,329,818 A | 7/1994 | Frick et al. | 73/708 |
| 5,412,535 A | 5/1995 | Chao et al. | 361/700 |
| 5,492,016 A | 2/1996 | Pinto et al. | 73/724 |
| 5,495,769 A | 3/1996 | Broden et al. | 73/18 |
| 5,506,757 A | 4/1996 | Brorby | 361/796 |
| 5,531,936 A | 7/1996 | Kanatzidis et al. | 252/587 |
| 5,542,300 A | 8/1996 | Lee | 73/724 |
| 5,554,809 A | 9/1996 | Tobita et al. | 73/700 |
| 5,554,922 A | 9/1996 | Kunkel | 322/3 |
| 5,599,172 A * | 2/1997 | McCabe | 417/334 |
| 5,606,513 A | 2/1997 | Louwagie et al. | 702/138 |
| 5,610,552 A | 3/1997 | Schlesinger et al. | 327/560 |
| 5,614,128 A | 3/1997 | Kanatzidis et al. | 252/582 |
| 5,618,471 A | 4/1997 | Kanatzidis et al. | 252/582 |
| 5,637,802 A | 6/1997 | Frick et al. | 73/724 |
| 5,642,301 A | 6/1997 | Warrior et al. | 364/571.02 |
| 5,644,185 A | 7/1997 | Miller | 310/306 |
| 5,656,782 A | 8/1997 | Powell, II et al. | 73/756 |
| 5,665,899 A | 9/1997 | Willcox | 731/1.63 |
| 5,682,476 A | 10/1997 | Tapperson et al. | 395/200.05 |
| 5,705,978 A | 1/1998 | Frick et al. | 340/511 |
| 5,722,249 A | 3/1998 | Miller, Jr. | 62/238.2 |
| 5,757,608 A | 5/1998 | Bernot et al. | 361/283.4 |
| 5,787,120 A | 7/1998 | Louagie et al. | 375/257 |
| 5,793,963 A | 8/1998 | Tapperson et al. | 395/200.31 |
| 5,803,604 A | 9/1998 | Pompei | 374/181 |
| 5,811,201 A * | 9/1998 | Skowronski | 429/17 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,929,372 A | 7/1999 | Oudoire et al. | 136/208 |
| 5,954,526 A | 9/1999 | Smith | 439/136 |
| 5,957,727 A | 9/1999 | Page, Jr. | 439/607.58 |
| 5,978,658 A | 11/1999 | Shoji | 455/66 |
| 5,992,240 A | 11/1999 | Tsuruoka et al. | 73/718 |
| 6,013,204 A | 1/2000 | Kanatzidis et al. | 252/584 |
| 6,038,927 A | 3/2000 | Karas | 73/706 |
| 6,079,276 A | 6/2000 | Frick et al. | 73/18 |
| 6,104,759 A | 8/2000 | Carkner et al. | 375/295 |
| 6,109,979 A | 8/2000 | Garnett | 439/709 |
| 6,126,327 A | 10/2000 | Bi et al. | 709/221 |
| 6,127,739 A | 10/2000 | Appa | 290/55 |
| 6,150,798 A | 11/2000 | Ferry et al. | 323/273 |
| D439,177 S | 3/2001 | Fandrey et al. | D10/46 |
| D439,178 S | 3/2001 | Fandrey et al. | D10/46 |
| D439,179 S | 3/2001 | Fandrey et al. | D10/46 |
| D439,180 S | 3/2001 | Fandrey et al. | D10/85 |
| D439,181 S | 3/2001 | Fandrey et al. | D10/46 |
| D441,672 S | 5/2001 | Fandrey et al. | D10/52 |
| 6,236,096 B1 | 5/2001 | Chang et al. | 257/419 |
| 6,236,334 B1 | 5/2001 | Tapperson et al. | 340/825 |
| 6,255,010 B1 | 7/2001 | George et al. | 429/30 |
| 6,282,247 B1 | 8/2001 | Shen | 375/285 |
| 6,295,875 B1 | 10/2001 | Frick et al. | 73/718 |
| 6,312,617 B1 | 11/2001 | Kanatzidis et al. | 252/62.3 |
| 6,326,764 B1 * | 12/2001 | Virtudes | 320/101 |
| 6,338,283 B1 | 1/2002 | Blazquez Navarro | 73/865.8 |
| 6,360,277 B1 | 3/2002 | Ruckley et al. | 709/250 |
| 6,385,972 B1 | 5/2002 | Fellows | 60/517 |
| 6,405,139 B1 | 6/2002 | Kicinski et al. | 702/33 |
| 6,429,786 B1 | 8/2002 | Bansemir et al. | 340/870.27 |
| 6,441,747 B1 | 8/2002 | Khair et al. | 340/870.16 |
| 6,457,367 B1 | 10/2002 | Behm et al. | 73/753 |
| 6,480,699 B1 | 11/2002 | Lovoi | 455/41.2 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,508,131 B2 | 1/2003 | Frick | 73/756 |
| 6,510,740 B1 | 1/2003 | Behm et al. | 73/708 |
| 6,511,337 B1 | 1/2003 | Fandrey et al. | 439/320 |
| D471,829 S | 3/2003 | Dennis et al. | D10/85 |
| D472,831 S | 4/2003 | Dennis et al. | D10/85 |
| 6,546,805 B2 | 4/2003 | Fandrey et al. | 73/753 |
| 6,553,076 B1 | 4/2003 | Huang | 375/257 |
| 6,568,279 B2 | 5/2003 | Behm et al. | 73/753 |
| 6,571,132 B1 | 5/2003 | Davis et al. | 700/2 |
| 6,574,515 B1 | 6/2003 | Kirkpatrick et al. | 700/19 |
| 6,593,857 B1 | 7/2003 | Roper et al. | 340/870.3 |
| 6,609,427 B1 | 8/2003 | Westfield et al. | 73/753 |
| 6,640,308 B1 | 10/2003 | Keyghobad et al. | 713/300 |
| 6,661,220 B1 | 12/2003 | Glehr | 324/207.17 |
| 6,662,662 B1 | 12/2003 | Nord et al. | 73/715 |
| 6,667,594 B2 | 12/2003 | Chian | 318/696 |
| 6,680,690 B1 | 1/2004 | Nilsson et al. | 342/124 |
| 6,711,446 B2 | 3/2004 | Kirkpatrick et al. | 700/19 |

| Patent/Pub No. | Date | Inventor | Class |
|---|---|---|---|
| 6,744,814 B1 | 6/2004 | Blanksby et al. | 375/232 |
| 6,747,573 B1 | 6/2004 | Gerlach et al. | 340/870.21 |
| 6,765,968 B1 | 7/2004 | Nelson et al. | 375/257 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,794,067 B1 * | 9/2004 | Acker et al. | 429/408 |
| 6,823,072 B1 | 11/2004 | Hoover | 381/7 |
| 6,838,859 B2 | 1/2005 | Shah | 322/38 |
| 6,839,546 B2 | 1/2005 | Hedtke | 455/67.11 |
| 6,839,790 B2 | 1/2005 | Barros De Almeida et al. | 710/305 |
| 6,843,110 B2 | 1/2005 | Deane et al. | 73/114.35 |
| 6,891,477 B2 | 5/2005 | Aronstam | 340/606 |
| 6,891,838 B1 | 5/2005 | Petite et al. | 370/401 |
| 6,898,980 B2 | 5/2005 | Behm et al. | 73/756 |
| 6,901,523 B2 * | 5/2005 | Verdun | 713/320 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,942,728 B2 | 9/2005 | Caillat et al. | 117/3 |
| 6,961,624 B2 * | 11/2005 | Kirkpatrick et al. | 700/19 |
| 6,984,899 B1 * | 1/2006 | Rice | 290/44 |
| 6,995,677 B2 | 2/2006 | Aronstam et al. | 340/606 |
| 6,995,685 B2 | 2/2006 | Randall | 340/870.39 |
| 7,010,294 B1 | 3/2006 | Pyotsia et al. | 455/420 |
| 7,036,983 B2 | 5/2006 | Green et al. | 374/179 |
| 7,058,542 B2 | 6/2006 | Hauhia et al. | 702/183 |
| 7,073,394 B2 | 7/2006 | Foster | 73/861.22 |
| 7,088,285 B2 | 8/2006 | Smith | 342/124 |
| 7,109,883 B2 | 9/2006 | Trimble et al. | 340/870.16 |
| 7,116,036 B2 | 10/2006 | Balasubramaniam et al. | 310/322 |
| 7,173,343 B2 * | 2/2007 | Kugel | 290/1 R |
| 7,197,953 B2 | 4/2007 | Olin | 73/866.5 |
| 7,233,745 B2 | 6/2007 | Loechner | 398/128 |
| 7,262,693 B2 | 8/2007 | Karschnia et al. | 340/508 |
| 7,271,679 B2 | 9/2007 | Lundberg et al. | 333/24 |
| 7,301,454 B2 | 11/2007 | Seyfang et al. | 340/539.26 |
| 7,319,191 B2 | 1/2008 | Poon et al. | 174/50.62 |
| 7,329,959 B2 | 2/2008 | Kim et al. | 290/2 |
| 7,351,098 B2 | 4/2008 | Gladd et al. | 439/578 |
| 7,560,907 B2 | 7/2009 | Nelson | 322/37 |
| 7,626,141 B2 | 12/2009 | Rodriguez-Medina et al. | 219/260 |
| 7,726,017 B2 | 6/2010 | Evans et al. | 29/854 |
| 7,983,049 B2 | 7/2011 | Leifer et al. | 361/728 |
| 2001/0025349 A1 | 9/2001 | Sharood et al. | 713/340 |
| 2002/0011115 A1 | 1/2002 | Frick | 73/718 |
| 2002/0029130 A1 | 3/2002 | Eryurek et al. | 702/183 |
| 2002/0065631 A1 | 5/2002 | Loechner | 702/188 |
| 2002/0082799 A1 | 6/2002 | Pramanik | 702/130 |
| 2002/0095520 A1 | 7/2002 | Wettstein et al. | 709/253 |
| 2002/0097031 A1 | 7/2002 | Cook et al. | 323/273 |
| 2002/0105968 A1 | 8/2002 | Pruzan et al. | 370/465 |
| 2002/0148236 A1 | 10/2002 | Bell | 62/3.3 |
| 2002/0163323 A1 | 11/2002 | Kasai et al. | 323/284 |
| 2003/0030537 A1 | 2/2003 | Kogure | 340/3.5 |
| 2003/0032993 A1 | 2/2003 | Mickle et al. | 600/509 |
| 2003/0042740 A1 * | 3/2003 | Holder et al. | 290/1 A |
| 2003/0043052 A1 | 3/2003 | Tapperson et al. | 340/825.37 |
| 2003/0079553 A1 | 5/2003 | Cain et al. | 73/861.27 |
| 2003/0083038 A1 | 5/2003 | Poon et al. | 455/344 |
| 2003/0097521 A1 | 5/2003 | Pfandler et al. | 711/103 |
| 2003/0134161 A1 * | 7/2003 | Gore et al. | 429/12 |
| 2003/0143958 A1 | 7/2003 | Elias et al. | 455/73 |
| 2003/0167631 A1 | 9/2003 | Hallenbeck | 29/835 |
| 2003/0171827 A1 * | 9/2003 | Keyes et al. | 700/19 |
| 2003/0199778 A1 | 10/2003 | Mickle et al. | 600/509 |
| 2003/0204371 A1 | 10/2003 | Sciamanna | 702/183 |
| 2004/0081872 A1 * | 4/2004 | Herman et al. | 429/26 |
| 2004/0085240 A1 | 5/2004 | Faust | 342/124 |
| 2004/0086021 A1 | 5/2004 | Litwin | 374/120 |
| 2004/0142733 A1 | 7/2004 | Parise | 455/572 |
| 2004/0159235 A1 | 8/2004 | Marganski et al. | 95/116 |
| 2004/0184517 A1 | 9/2004 | Westfield et al. | 375/219 |
| 2004/0199681 A1 | 10/2004 | Hedtke | 710/37 |
| 2004/0200519 A1 | 10/2004 | Sterzel et al. | 136/238 |
| 2004/0203434 A1 | 10/2004 | Karschnia et al. | 455/67.11 |
| 2004/0211456 A1 | 10/2004 | Brown et al. | 136/243 |
| 2004/0214543 A1 | 10/2004 | Osone et al. | 455/197.2 |
| 2004/0218326 A1 | 11/2004 | Duren et al. | 361/93.1 |
| 2004/0242169 A1 | 12/2004 | Albsmeier et al. | 455/91 |
| 2004/0249483 A1 * | 12/2004 | Wojsznis et al. | 700/52 |
| 2004/0259533 A1 | 12/2004 | Nixon et al. | 455/414.1 |
| 2005/0011278 A1 | 1/2005 | Brown et al. | 73/861.18 |
| 2005/0017602 A1 | 1/2005 | Arms et al. | 310/339 |
| 2005/0023858 A1 | 2/2005 | Bingle et al. | 296/76 |
| 2005/0029236 A1 | 2/2005 | Gambino et al. | 219/121.69 |
| 2005/0040570 A1 | 2/2005 | Asselborn | 266/99 |
| 2005/0044241 A1 * | 2/2005 | Dunstan | 709/228 |
| 2005/0046595 A1 | 3/2005 | Blyth | 340/908 |
| 2005/0056106 A1 | 3/2005 | Nelson et al. | 73/866.3 |
| 2005/0072239 A1 | 4/2005 | Longsdorf et al. | 73/649 |
| 2005/0074324 A1 * | 4/2005 | Yoo | 415/4.3 |
| 2005/0076944 A1 | 4/2005 | Kanatzidis et al. | 136/239 |
| 2005/0082949 A1 * | 4/2005 | Tsujiura | 310/339 |
| 2005/0099010 A1 | 5/2005 | Hirsch | 290/42 |
| 2005/0109395 A1 | 5/2005 | Seberger | 137/8 |
| 2005/0115601 A1 | 6/2005 | Olsen et al. | 136/212 |
| 2005/0118468 A1 | 6/2005 | Adams et al. | 429/22 |
| 2005/0122653 A1 * | 6/2005 | McCluskey et al. | 361/92 |
| 2005/0130605 A1 | 6/2005 | Karschnia et al. | 455/90.3 |
| 2005/0132828 A1 | 6/2005 | Brown et al. | 73/592 |
| 2005/0134148 A1 | 6/2005 | Buhler et al. | 310/339 |
| 2005/0139250 A1 | 6/2005 | DeSteese et al. | 136/212 |
| 2005/0164684 A1 | 7/2005 | Chen et al. | 455/141.1 |
| 2005/0182501 A1 | 8/2005 | Franchuk et al. | 700/81 |
| 2005/0201349 A1 | 9/2005 | Budampati | 370/342 |
| 2005/0208908 A1 | 9/2005 | Karschnia et al. | 455/127.1 |
| 2005/0222698 A1 | 10/2005 | Eryurek et al. | 700/90 |
| 2005/0228509 A1 | 10/2005 | James | 700/19 |
| 2005/0245291 A1 | 11/2005 | Brown et al. | 455/572 |
| 2005/0273205 A1 * | 12/2005 | Nickerson et al. | 700/284 |
| 2005/0276233 A1 | 12/2005 | Shepard et al. | 370/254 |
| 2005/0281215 A1 | 12/2005 | Budampati et al. | 370/328 |
| 2005/0289276 A1 | 12/2005 | Karschnia et al. | 710/305 |
| 2006/0002368 A1 | 1/2006 | Budampati et al. | 370/351 |
| 2006/0028327 A1 | 2/2006 | Amis | 340/431 |
| 2006/0036404 A1 | 2/2006 | Wiklund et al. | 702/183 |
| 2006/0060236 A1 | 3/2006 | Kim et al. | 136/203 |
| 2006/0063522 A1 | 3/2006 | McFarland | 455/423 |
| 2006/0077917 A1 | 4/2006 | Brahmajosyula et al. | 370/310 |
| 2006/0088751 A1 * | 4/2006 | Stefener et al. | 429/34 |
| 2006/0092039 A1 | 5/2006 | Saito et al. | 340/825.37 |
| 2006/0128689 A1 * | 6/2006 | Gomtsyan et al. | 514/217.01 |
| 2006/0131428 A1 | 6/2006 | Wang et al. | 235/492 |
| 2006/0134470 A1 * | 6/2006 | Kaye et al. | 429/12 |
| 2006/0148410 A1 | 7/2006 | Nelson et al. | 455/67.11 |
| 2006/0181406 A1 | 8/2006 | Petite et al. | 340/521 |
| 2006/0227729 A1 | 10/2006 | Budampati et al. | 370/278 |
| 2006/0266404 A1 | 11/2006 | Hiller et al. | 136/205 |
| 2006/0274644 A1 | 12/2006 | Budampati et al. | 370/216 |
| 2006/0274671 A1 | 12/2006 | Budampati et al. | 370/254 |
| 2006/0287001 A1 | 12/2006 | Budampati et al. | 455/552.1 |
| 2006/0290328 A1 | 12/2006 | Orth | 323/218 |
| 2007/0006528 A1 | 1/2007 | Diebold et al. | 48/197 R |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1 * | 3/2007 | Florenz et al. | 702/50 |
| 2007/0135867 A1 * | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/557 |
| 2007/0279009 A1 | 12/2007 | Kobayashi | 320/166 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samundrala et al. | 370/466 |
| 2007/0282463 A1 | 12/2007 | Hodson et al. | 700/20 |
| 2007/0285224 A1 | 12/2007 | Karschnia et al. | 340/538 |
| 2007/0288204 A1 | 12/2007 | Gienke et al. | 702/188 |
| 2008/0010600 A1 | 1/2008 | Katano | 715/748 |
| 2008/0054645 A1 | 3/2008 | Kulkarni et al. | |

| | | | | | | | |
|---|---|---|---|---|---|---|---|
| 2008/0083446 | A1 | 4/2008 | Chakraborty et al. ........ 136/205 | WO | WO 2004/059139 | | 7/2004 |
| 2008/0088464 | A1 | 4/2008 | Gutierrez ...................... 340/606 | WO | WO 2004/082051 | | 9/2004 |
| 2008/0123581 | A1 | 5/2008 | Wells et al. | WO | WO 2004/094892 | | 11/2004 |
| 2008/0141769 | A1 | 6/2008 | Schmidt et al. ............ 73/204.19 | WO | WO 2005/086331 | | 9/2005 |
| 2008/0280568 | A1 | 11/2008 | Kielb et al. ................... 455/74.1 | WO | WO 2006/109362 | | 10/2006 |
| 2008/0310195 | A1 | 12/2008 | Seberger et al. ................ 363/26 | WO | WO 2007/002769 | | 1/2007 |
| 2009/0015216 | A1 | 1/2009 | Seberger et al. .............. 323/234 | WO | WO 2005/060482 | | 7/2007 |
| 2009/0066587 | A1 | 3/2009 | Hayes et al. .................. 343/702 | WO | WO 2009/003146 | | 12/2008 |
| 2009/0081957 | A1 | 3/2009 | Sinreich ......................... 455/68 | WO | WO 2009/003148 | | 12/2008 |
| 2009/0167613 | A1 | 7/2009 | Hershey et al. ............... 343/702 | WO | WO 2009/063056 | | 5/2009 |
| 2009/0195222 | A1 | 8/2009 | Lu et al. ............................ 322/3 | | | | |
| 2009/0200489 | A1 | 8/2009 | Tappel et al. .............. 250/492.3 | | | | |
| 2009/0260438 | A1 | 10/2009 | Hedtke ........................... 73/579 | | | | |
| 2009/0311975 | A1 | 12/2009 | Vanderaa et al. ............. 455/90.3 | | | | |

FOREIGN PATENT DOCUMENTS

| | | |
|---|---|---|
| CN | 1251953 | 5/2000 |
| CN | 1429354 | 7/2003 |
| CN | 1442822 | 9/2003 |
| CN | 100386602 C | 4/2005 |
| DE | 2710211 | 9/1978 |
| DE | 3340834 A1 | 5/1985 |
| DE | 3842379 | 6/1990 |
| DE | 196 22 295 | 5/1996 |
| DE | 201 07 112 U1 | 7/2001 |
| DE | 101 04 582 A1 | 10/2001 |
| DE | 100 41 160 | 3/2002 |
| DE | 102 21 931 A1 | 5/2002 |
| DE | 10 2004 020 393 | 11/2005 |
| EP | 0 518 916 B1 | 2/1991 |
| EP | 0 524 550 A1 | 1/1993 |
| EP | 0 895 209 A1 | 2/1999 |
| EP | 0 945 714 | 9/1999 |
| EP | 1 202 145 | 5/2002 |
| EP | 1 202 145 A1 | 5/2002 |
| EP | 1 192 614 | 1/2003 |
| EP | 1 293 853 | 3/2003 |
| EP | 1 482 568 A2 | 12/2004 |
| EP | 1879294 | 1/2008 |
| FI | 118699 B | 2/2008 |
| GB | 1 397 435 A | 6/1975 |
| GB | 2 145 876 A | 4/1985 |
| GB | 2293446 A | 3/1996 |
| GB | 2 320 733 A | 7/1998 |
| GB | 2 403 043 | 6/2004 |
| JP | 59-075684 | 4/1984 |
| JP | 60-125181 | 7/1985 |
| JP | 02 067794 | 3/1990 |
| JP | 06 199284 A | 7/1994 |
| JP | 09-182308 | 7/1997 |
| JP | 11-036981 | 2/1999 |
| JP | 11-215867 | 8/1999 |
| JP | 11-303726 | 11/1999 |
| JP | 2001-524226 | 11/2001 |
| JP | 2002-369554 | 12/2002 |
| JP | 2003/042881 | 2/2003 |
| JP | 2003051894 | 2/2003 |
| JP | 2003134261 | 5/2003 |
| JP | 2003-195903 | 7/2003 |
| JP | 2004021877 | 1/2004 |
| JP | 2004-069197 | 3/2004 |
| JP | 2004 146254 | 5/2004 |
| JP | 2004208476 | 7/2004 |
| JP | 2005-72080 | 3/2005 |
| RU | 2 131 934 C1 | 6/1999 |
| RU | 2168062 C1 | 5/2001 |
| RU | 2003128989 | 1/2007 |
| SU | 1746056 | 7/1992 |
| SU | 1813916 A1 | 5/1993 |
| WO | WO 88/05964 | 8/1988 |
| WO | WO 91/11029 | 7/1991 |
| WO | WO 91/13417 | 9/1991 |
| WO | WO 95/07522 | 3/1995 |
| WO | WO 99/53286 | 10/1999 |
| WO | WO 01/48723 | 7/2001 |
| WO | WO 02/05241 | 1/2002 |
| WO | WO 03/023536 | 3/2003 |
| WO | WO 03/089881 | 10/2003 |
| WO | WO 2004/038998 | 5/2004 |

OTHER PUBLICATIONS

Larwood et al., Controlled Velocity Testing of an 8-kW Wind Turbine, American Wind Energy Association's WindPower 2001 Conference, Jul. 2001.*

Schmidt, Piezoelectric Energy Conversion in Windmills, IEEE, 1992.*

Schmidt, Theoretical Electric Power Output Per Unit Volume of PVf and Mechanical to Electrical Conversion Efficiency as Functions of Frequency, IEEE 1986.*

The International Search Report and Written Opinion in Appln. No. PCT/US2006/035728, filed Sep. 13, 2006.

USA & Metric Thread Standards http://www.carrlane.com/Catalog/index.cfm/29425071FOB221118070C1C513906103E05543B0B05543B0B012009083C3B285357474A2D020609090C0015312A36515F554A5B.

Notification of Transmittal of the International Search Report or the Declaration—PCT/US03/10403.

"Wireless R&D Aims to Boost Traffic", by M. Moore, *InTech with Industrial Computing*, Feb. 2002, 3 pgs.

"System Checks Faraway Machines' Health", by J. Strothman, *InTech with Industrial Computing*, Feb. 2002, 1 pg.

"Wireless Management Toolkit XYR 5000", by Honeywell International Inc., Phoenix, Arizona, 3 pgs., Oct. 2003.

"Wireless Analog Input Transmitters XYR 5000", by Honeywell International Inc., Phoenix, Arizona, 4 pgs., Oct. 2003.

"Quad Analog Output Module Installation and User's Manual", by Honeywell International Inc., Phoenix, Arizona, pp. Ii, iii, iv and 1-12, Dec. 2003.

International Search Report and Written Opinion of Application No. PCT/US2005/015848, file May 5, 2005.

"Wireless Dual Analog Input Interface Transmitter Installation and User's Manual", by Honeywell International Inc., Phoenix, Arizona, pp. Ii-vi and 7-43, Dec. 2003.

"XYR 5000 Wireless Dual Analog Input Interface, Model Selection Guide", by Honeywell International Inc., Phoenix, Arizona, Dec. 2003.

"Wireless Measure, Monitor & Control", by Accutech, 4 pgs. May 2003.

"Wireless Instrumentation, Multi-Input Field Unit", by Accutech, 2 pgs., Dec. 2003.

"Quad Analog Output Module", by Accutech, 1 pg. Dec. 2003.

3 Pages from Website www.chemicalprocessing.com, Apr. 2004.

4 Pages from Website http://content.honeywell.com/imc/eznews/eznews0403/news.htm, 2004.

The International Search Report and Written Opinion in Appln. No. PCT/US2005/021757, filed Jun. 21, 2005.

The First Communication of European Patent Application 06 80 3540.1, filed Sep. 13, 2006.

First Office Action of Chinese patent application 200580006438.X, filed Mar. 2, 2005.

Examiner's consultation for European patent application 05 724 190.3, filed Mar. 2, 2005.

Examination Report of the European Patent Office in Application No. 05724190.3, filed Mar. 2, 2005.

The Official Communication in Application No. 05746241.8, filed May 5, 2005.

Second Office Action from Chinese Patent Application No. 2005800142512.4, filed May 5, 2005.

Second Office Action from Chinese patent application No. 200580014212.4, filed May 2005.

Notification of Transmittal of the International Search Report and the Written Opinion, PCT/US2007/019636, dated Oct. 1, 2008.

Invitation to Pay Additional Fees and Partial Search Report, PCT/US2007/019396, dated Oct. 7, 2008.

The Official Action in Application No. 2006145434/09, filed May 5, 2005.

First examination report for Indian application No. 3589/CHENP/2006, dated Apr. 17, 2009.
Second Office Action from Chinese patent application No. 200580006438.X, dated Apr. 10, 2009.
Third Office Action from Chinese patent application No. 200580014212.4, dated Dec. 19, 2008.
Official Action from Russian patent application 2008116682, dated Jan. 16, 2009.
Second Official Action from Russian patent application No. 2008116682, filed. Sep. 13, 2006.
Decision on refusal to grant a patent for invention for Russian patent application No. 2006145434, filed May 5, 2005.
Fourth Office Action for Chinese patent application No. 200580014212.4, dated Jul. 24, 2009.
Official Letter for Mexican patent application No. PA/A/2006/013488, dated Jun. 25, 2009.
Fourth Official Action issued for Russian patent application No. 2008116682, dated Dec. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat Sink . . . ," http://www.enertron-inc.com/enertron-products/integrated-heat-sink.php, Mar. 31, 2006.
Office Action from U.S. Appl. No. 11/028,486, dated May 9, 2008.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Search Report and Written Opinion for international patent application No. PCT/US2009/002476, dated Apr. 21, 2009.
Third Office Action from Chinese patent application No. 200580006438.X, dated Sep. 28, 2009.
First Office Action from Chinese patent application No. 200580014212.4, dated Mar. 14, 2008.
First Official Action from Russian patent application No. 2006134646, dated Mar. 12, 2008.
First Official Action from Russian patent application No. 2008103014, dated Jun. 9, 2009.
First Office Action for Chinese patent application No. 200680015575.4, dated Oct. 31, 2008.
Fifth Office Action from Chinese patent application No. 200580014212.4, dated Nov. 13, 2009.
Second Office Action for Chinese patent application No. 200680015575.4, dated Sep. 25, 2009.
Second Official Action for Russian patent application No. 2006145434, dated Apr. 2, 2008.
First Office Action for Chinese patent application No. 200680035248.5, dated Nov. 6, 2009.
Third Official Action for Russian patent application No. 2008116682, dated Sep. 11, 2009.
Communication from European Patent Office dated Mar. 2, 2010 for European application No. 06 803 540.1.
Foundation Fieldbus Power Supply, A Look at Powering Fieldbus, www.analogservices.com/fbsupp2.pdf, Oct. 22, 2000.
Fourth Office Action from Chinese application No. 2005/80006438.x dated May 17, 2010.
First Office Action from Japanese patent application No. 2008-532280 dated Mar. 1, 2011.
U.S. Appl. No. 12/855,128, filed Aug. 12, 2010.
Office Action from European Application No. 05746241.8, dated Aug. 29, 2007.
International Search Report for International Application No. PCT/US 03/27561, filed Mar. 9, 2003, dated Jun. 15, 2004.

2002 Microchip Technology Inc., "Stand-Alone CAN Controller with SPI™ Interface," pp. 1-75, Mar. 1, 2002.
Rosemount Reference Manual 00809-0100-4022,Rev AA, Jul. 2002, "Model 4600 Oil & Gas Panel Transmitter," 65 pages.
Transmitter Schematic, Sold Jul. 2002, 5 pages.
Notification of Transmittal of the International Search Report and the Written Opinion for the international patent application No. PCT/US2010/047463 dated Dec. 1, 2010.
Notification of Transmittal of the International Search Report and the Written Opinion of the International Searching Authority for International Application No. PCT/US2006/025206 dated Nov. 10, 2006.
"Mechatronic Drives in Mobile Hydraulics," Internet Article, Soncebox News. No. 4, Oct. 2004.
Office Action from European Application No. 05853808.3, dated Nov. 6, 2007.
The International Search Report and Written Opinion in Application No. PCT/US2009/003619, dated Sep. 30, 2009.
The International Search Report and Written Opinion in Application No. PCT/US2006/035728, dated Jan. 12, 2007.
"Notification of Transmittal of the International Search Report and The Written Opinion of the International Searching Authority" for PCT/US2008/011451 dated Mar. 30, 2009.
The International Search Report and Written Opinion in Application No. PCT/US2009/003616, dated Jan. 13, 2010.
First Examination Report for Indian patent application No. 4676/CHENP/2006 dated Apr. 17, 2009.
The International Search Report and Written Opinion in Application No. PCT/US2009/003611, dated Nov. 4, 2009.
The International Search Report and Written Opinion in Application No. PCT/US2009/003621, dated Sep. 30, 2009.
Rejection Notice for Japanese patent application No. 2007527282 dated Jul. 22, 2010.
Summons to attend oral proceedings for the European application No. 05746241.8 dated May 26, 2010.
The sixth Office Action from Chinese application No. 2005800014212.4, dated Aug. 17, 2010.
The seventh Office Action from Chinese patent application No. 200580014212.4 issued on Jan. 31, 2011.
Notification of Transmittal of the International Search Report and the Written Opinion for International application No. PCT/US2009/062152 dated Jun. 2, 2010.
First Office Action for Chinese application No. 200780018710.5 dated May 12, 2010.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
The Official Communication from European patent application No. 05746241.8 dated Nov. 12, 2010.
The Minutes in accordance with Rule 124(4) EPC for European application No. 05746241.8 dated Nov. 4, 2010.
Communication pursuant to Rules 161 and 162 EPC from European patent application No. 09767057.4 dated Jan. 26, 2011.
Communication pursuant to Rules 161 and 162 EPC from European patent application No. 09767063.2 dated Jan. 28, 2011.
Communication from corresponding EP application No. 08837236.2 dated Nov. 3, 2010.
Notification of Transmittal of the International Search Report and the Written Opinion for the international patent application No. PCT/US2010/047444 dated Dec. 10, 2010.
Third Office Action for Chinese patent application No. 200680015575.4, dated Jun. 2010.
Decision on Refusal to Grant from Russian patent application No. 2006145434 dated Feb. 18, 2011.
Second Examination Report for Indian patent application No. 4676/Chenp/2006 dated Apr. 8, 2010.
The International Search Report and Written Opinion in Application No. PCT/US2009/003636, dated Oct. 6, 2009.
Second Office Action for the corresponding Chinese patent application No. 200680035248.5 dated Oct. 19, 2011.

* cited by examiner

POWER GENERATION FOR PROCESS DEVICES

CROSS-REFERENCE TO RELATED APPLICATIONS

This application is a continuation-in-part application of U.S. patent application Ser. No. 10/850,828, filed May 21, 2004, entitled WIRELESS POWER AND COMMUNICATION UNIT FOR PROCESS FIELD DEVICES.

BACKGROUND OF THE INVENTION

The present invention relates to industrial process control and monitoring systems. More specifically, the present invention relates to the generation of electrical power for such field devices.

In industrial settings, control systems are used to monitor and control inventories of industrial and chemical processes, and the like. Typically, the control system performs these functions using field devices distributed at key locations in the industrial process and coupled to the control circuitry in the control room by a process control loop. The term "field device" refers to any device that performs a function in a distributed control or process monitoring system, including all devices used in the measurement, control and monitoring of industrial processes.

Field devices, also referred to herein as process devices, are used by the process control and measurement industry for a variety of purposes. Usually such devices have a field-hardened enclosure so that they can be installed outdoors in relatively rugged environments and are able to withstand climatological extremes of temperature, humidity, vibration, mechanical shock, etc. These devices also can typically operate on relatively low power. For example, field devices are currently available that receive all of their operating power from a known 4-20 mA loop. These devices are able to not only operate upon the loop but communicate over the loop both with analog signals (actually modulating the 4-20 mA signal) and digitally.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by modulating the current running through the current loop to a current proportional to the sensed process variable. Other analog field devices can perform an action under the control of the control room by controlling the magnitude of the current through the loop. In addition to, or in the alternative, the process control loop can carry digital signals used for communication with field devices. Digital communication allows a much larger degree of communication than analog communication. Field devices that communicate digitally can respond to and communicate selectively with the control room and/or other field devices. Further, such devices can provide additional signaling such as diagnostics and/or alarms.

In some installations, wireless technologies have begun to be used to communicate with field devices. Wireless operation simplifies field device wiring and setup. Wireless installations are currently used in which the field device is manufactured to include an internal battery, potentially charged by a solar cell without any sort of wired connection. Problems exist in using an internal battery as the energy demands of wireless devices may vary greatly depending on numerous factors such as the device reporting rate, device elements, et cetera.

Difficulties also arise in installations where solar power is not reliable. For example, it becomes problematic to use solar power in areas that experience full shade twenty-four hours a day, seven days a week, or in parts of the world where solar isolation numbers are very small, such as in the Arctic circle. Accordingly, in these installations, powering a wireless process device using solar power is not reliable. Accordingly, there is an ongoing significant need for wireless process devices that can operate using an abundant renewable source of power that is not dependent upon the sun.

SUMMARY OF THE INVENTION

A process device includes a controller, a wireless communications module. The wireless communications module is coupled to the controller. A power generation module is provided to generate electricity for the process device. The power generator module can be disposed within the process device or it can be a separate unit coupled to the process device.

DETAILED DESCRIPTION OF THE PREFERRED EMBODIMENTS

The present invention provides electrical power generation for field devices using sources of energy that are located proximate the field device. Additionally, these sources of energy do not rely upon solar energy. Embodiments of the present invention include providing a wireless power and communication unit for allowing field devices that are designed for wired communication to operate wirelessly. Additionally, embodiments of the present invention include generating power for a field device using a non-solar source of energy disposed proximate the field device.

Embodiments of the present invention utilize a non-solar energy source proximate the field device in order to generate power for use by the field device. As used herein, the term "non-solar" includes any source of power generated by molecules physically proximate the process device. Thus, non-solar energy can include wind power, fuel cell technology that makes use of oxygen proximate the field device, and/or fuel cell technology that makes use of molecules in the process fluid itself for energy. Detailed descriptions of each of these embodiments is set forth in greater detail below.

Figure 1:
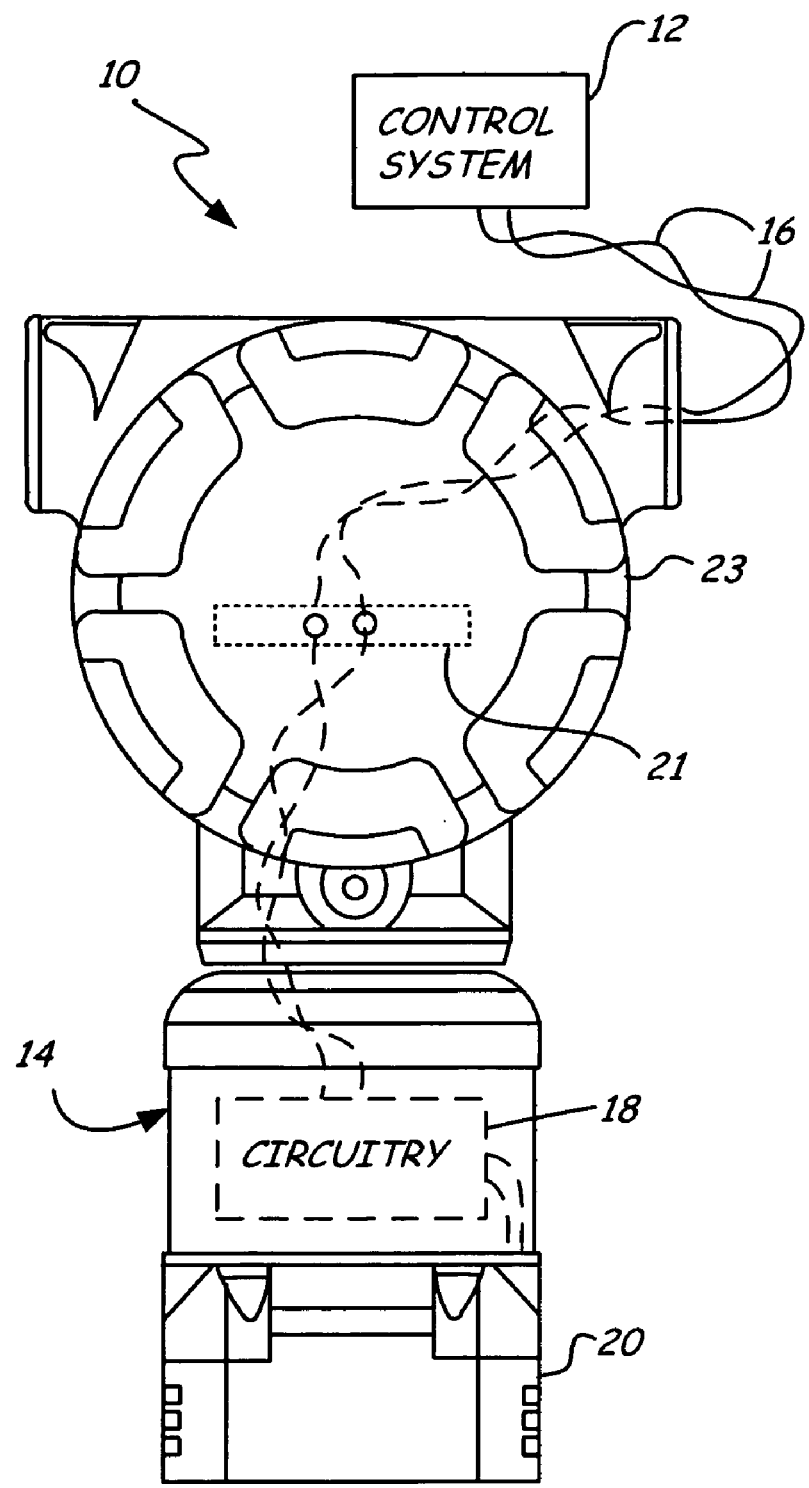
FIG. 1 is a diagrammatic view of an exemplary field device with which the wireless power and communication unit in accordance with the present invention is particularly useful.
Figure 2:
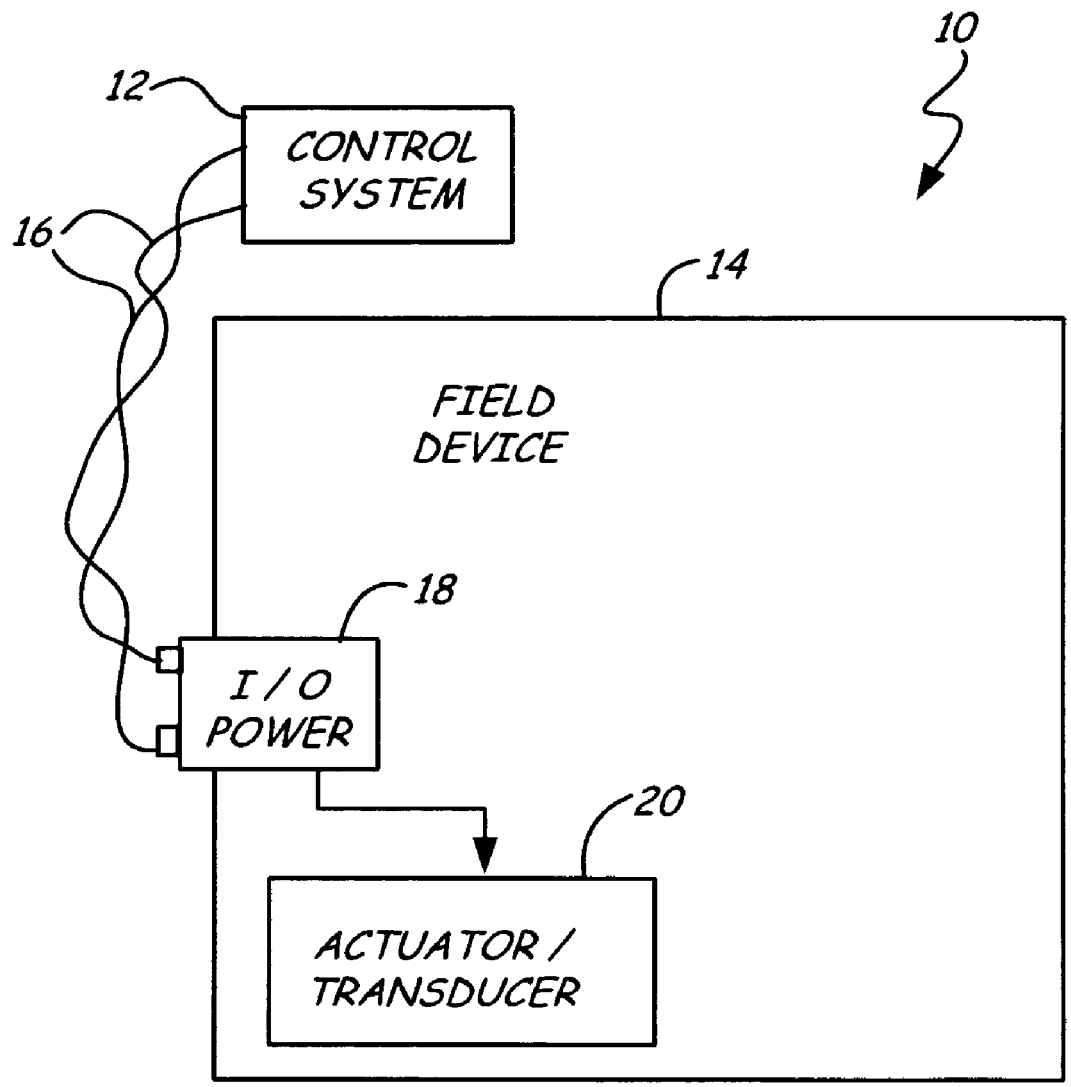
FIG. 2 is a block diagram of the field device shown in FIG. 1.

FIGS. 1 and 2 are diagrammatic and block diagram views of an exemplary field device with which a wireless power and communication unit in accordance with the present invention is useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication such as the Highway Addressable Remote Transducer (HART®) standard, as well as all-digital protocols such as the FOUNDATION™ Fieldbus standard. Generally process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable (PV) generator in that it couples to a process and senses an aspect, such as temperature, pressure, pH, flow, or other physical properties of the process and provides and indication thereof. Other examples of field devices include valves, actuators, controllers, and displays.

Generally field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference. Field devices of the sort illustrated in FIG. 1 represent a relatively large installed base of legacy devices, which are designed to operate in an entirely wired manner.

Figure 3:
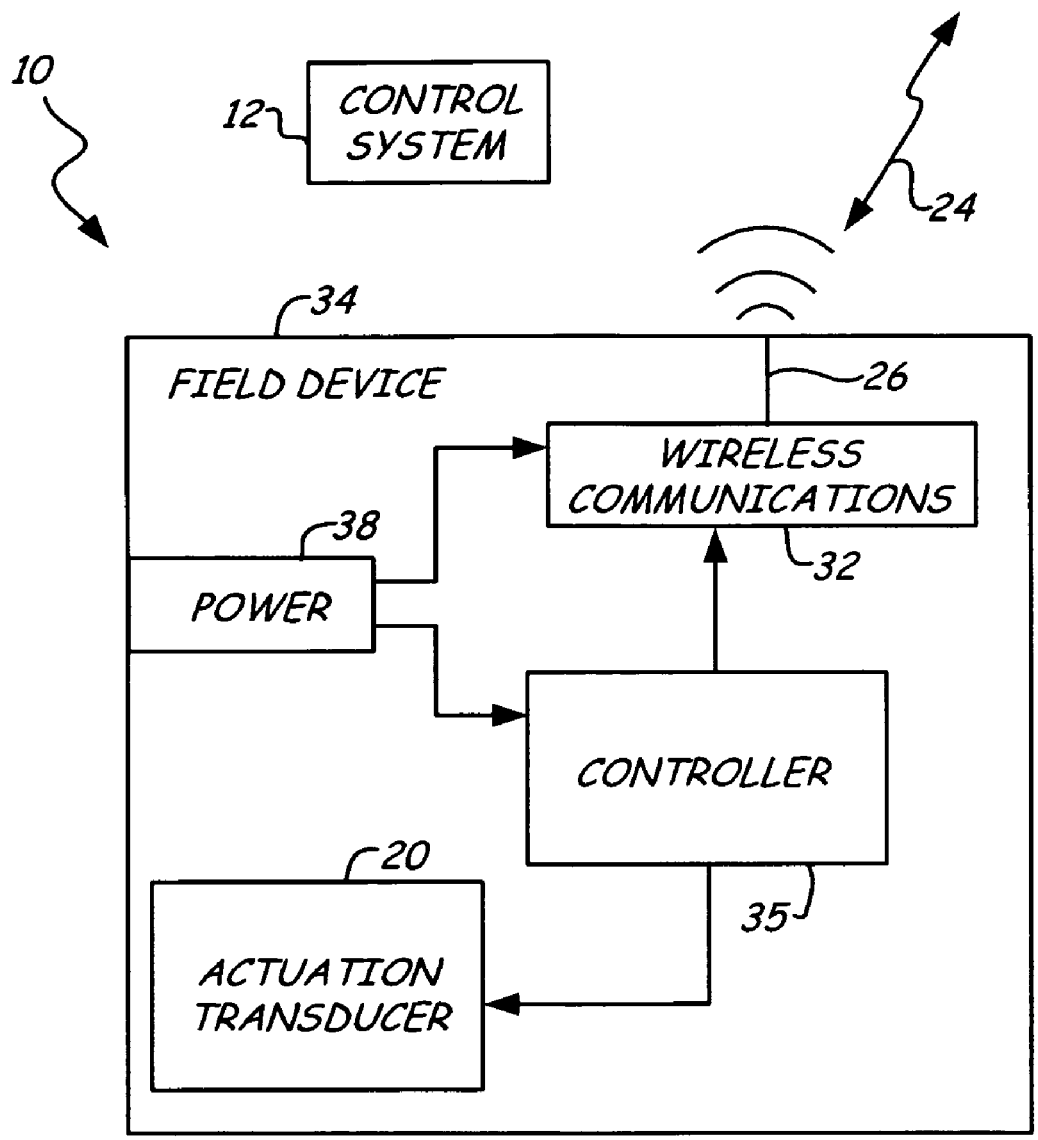
FIG. 3 is a block diagram of a field device including wireless communication circuitry for communicating with a remote device such as a display or hand held unit.

FIG. 3 is a block diagram of a wireless field device. Field device 34 includes power generation module 38, controller 35, wireless communication module 32, and actuator/transducer 20. Module 38 may include an internal power storage unit, and is adapted to power field device 34. Power generation module 38 generates electricity for device 34. The manner in which this generation occurs can take many forms and specific examples such as fuel cell and wind-based generators are provided later in the specification. The power from module 38 energizes controller 35 to interact with actuator/transducer 20 and wireless communications module 32. Wireless communications module 32, in turn, interacts with other devices as indicated by reference numeral 24 via antenna 26.

Figure 4:
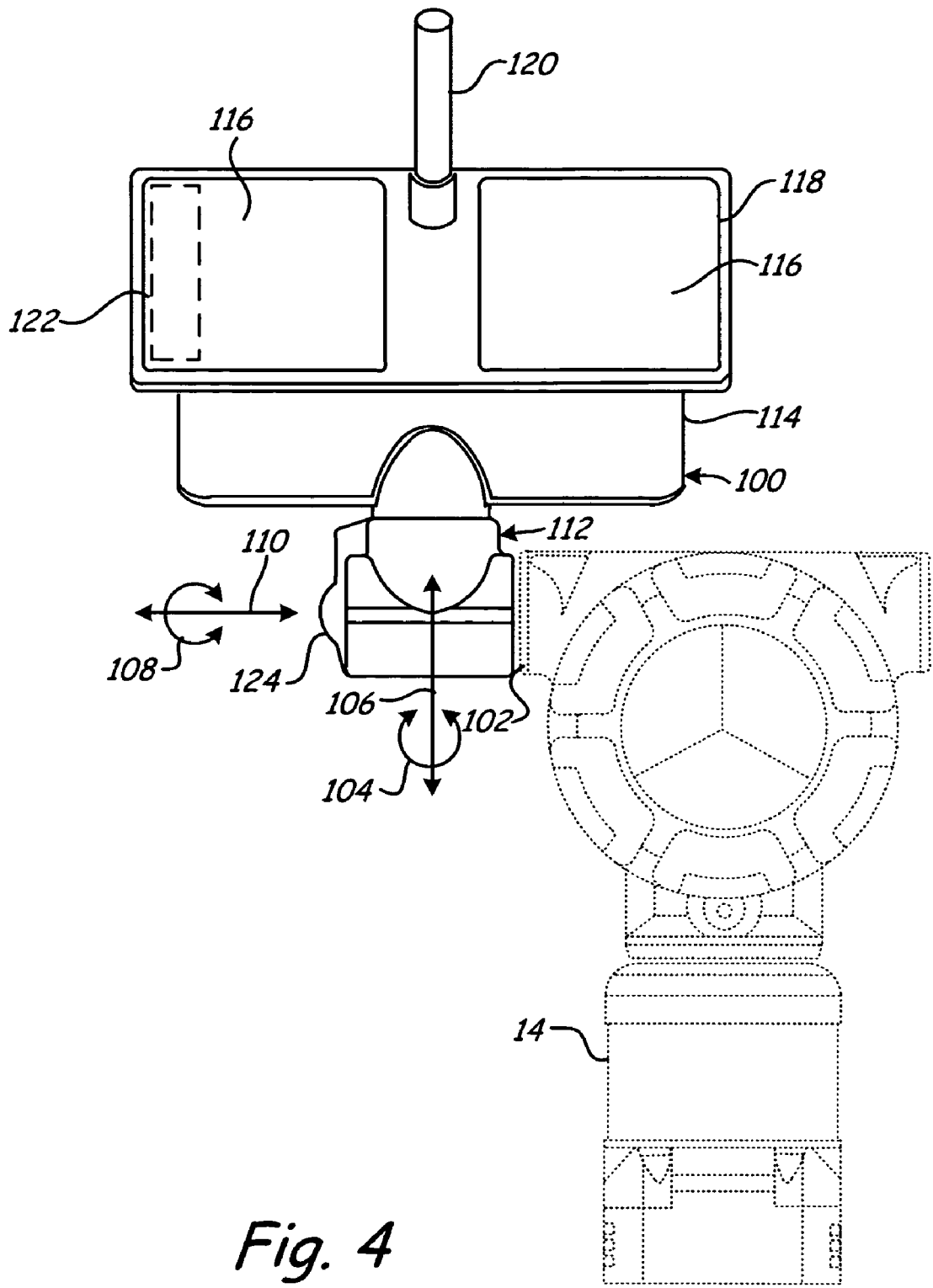
FIG. 4 is a front elevation view of a wireless power and communication unit in accordance with embodiments of the present invention mounted to a field device.

FIG. 4 is a front elevation view of a wireless power and communication unit 100 attached to a field device 14, shown in phantom. Unit 100 preferably attaches to device 14 via a standard field device conduit 102. Examples of suitable conduit connections include ½-14 NPT, M20×1.5, G½, and ⅜-18 NPT. Unit 100 may include a joint allowing rotation 104 about axis 106 and rotation 108 about axis 110. Further, attachment region 112 of unit 100 is preferably hollow in order to allow conductors therein to couple unit 100 to device 14. In embodiments where positional adjustment of the housing is not desired, attachment region 112 could simply be a piece of conduit.

Unit 100 includes housing 114 that is mounted upon attachment region 112. Housing 114 contains circuitry (described with respect to FIG. 8) to allow unit 100 to power and communicate with device 14 in accordance with a standard industry protocol such as 4-20 mA, HART®, FOUNDATION™ Fieldbus, Profibus-PA, Modbus, or CAN. Preferably, the protocol accommodates digital communication in order to enhance the level of interaction between unit 100 and device 14.

Since unit 100 is external to device 14, multiple variations of unit 100 can be provided with varying internal power generation modules depending upon the specific power requirements of the field device to which the unit will be attached. Unit 100 also preferably includes wireless communication circuitry (not shown in FIG. 4) which is coupled to antenna 120. Providing external antenna 120 facilitates wireless communication in comparison to internal antennas since many field-hardened enclosures are metal and would likely attenuate the wireless signal. However, embodiments with an internal antenna proximate a radio-transparent portion of housing 114, or cell(s) 116 can be practiced as well. External antenna embodiments, however, are particularly advantageous where unit 100 is field hardened in order to withstand environments similar to those for which field devices are designed.

Unit 100 can also include a local user interface. Accordingly unit 100 may include a display, such as an LCD display 122 that may be mounted proximate one of cells 116. In order to receive local user input, unit 100 can include one or more local inputs such as button 124. A local user interface is important because when the combined unit/field device system is operating totally wirelessly, it is more convenient for a technician to interact with the local user interface rather than wirelessly trying to access the device via a handheld computing device or the like. The local interface can be used to access the unit, the field device, or both. As defined herein "local user interface" means having either local user input(s) (such as a button), local user output(s) (such as an LCD), or a combination of the two. As illustrated in FIG. 4, the LCD can be co-located with cell(s) 116.

Figure 5A:
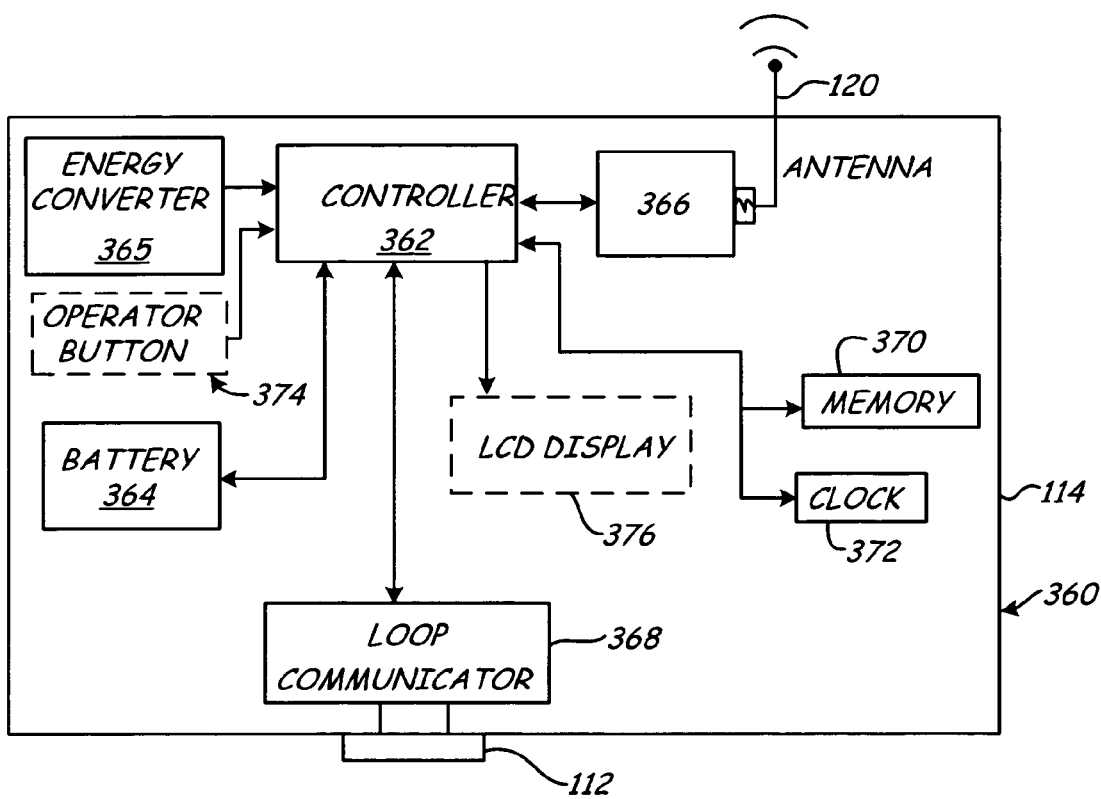
FIG. 5A is a block diagram of a wireless power and communication unit in accordance with embodiments of the present invention.
Figure 5B:
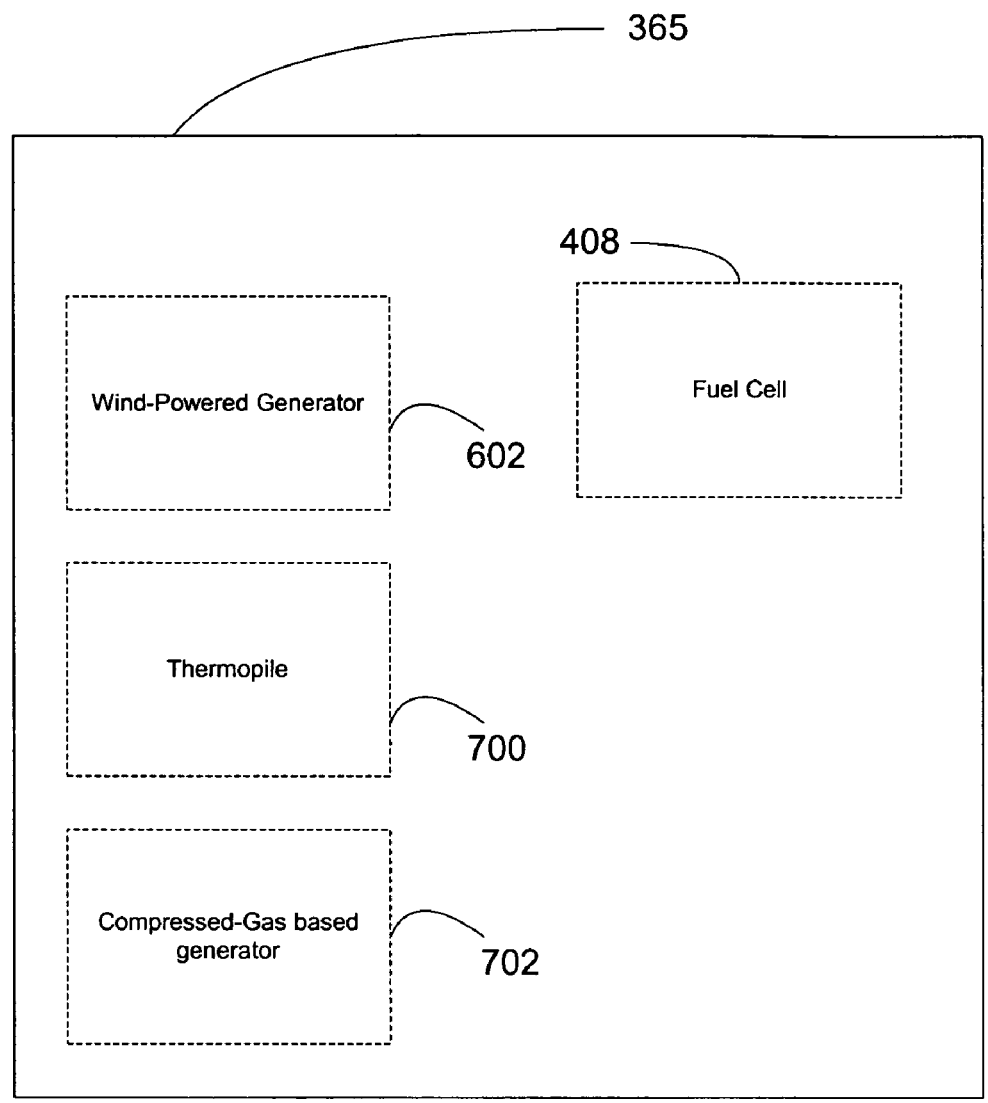
FIG. 5B is a block diagram of an energy conversion module in accordance with an embodiment of the present invention.

FIG. 5 is a block diagram of a wireless power and communication unit in accordance with embodiments of the present invention. Unit 360 includes controller 362, power storage device 364 (illustrated as a battery), energy converter 365, loop communicator 368, and wireless communication interface module 366.

Controller 362 preferably includes a low-power microprocessor and appropriate charging circuitry to convey suitable amounts of energy from cell(s) 116 and/or storage device 364 to power unit 360 and any field devices coupled to attachment region 112. Additionally, controller 362 also directs excess energy from cell(s) 116 and/or converter 365 to storage device 364. Controller 362 can also be coupled to optional temperature measurement circuitry such that controller 362 can reduce charging current to storage device 364 if device 364 begins to overheat. For example, the temperature measuring circuit may contain a suitable temperature-sensing element, such as a thermocouple coupled to storage device 364. An analog-to-digital converter then converts the signal from the thermocouple to a digital representation thereof, and provides the digital signal to controller 362.

Controller 362 can be configured, through hardware, software, or both to actively manage power for itself and attached field devices. In this regard, controller 362 can cause itself or any desired field devices to enter a low-power sleep mode. Sleep mode is any operating mode where power consumption is reduced. With respect to field devices, sleep mode could result from commanding the field device to set its operating current at its lowest allowable current rail. Events which may precipitate entering low-power mode could include: the expiration of an activity period, an input from one or more of the local user inputs, communication from one or more attached field devices, or wireless communication. Such events could also be used to cause unit 360 and/or any attached field devices to awaken from sleep mode. Additionally, controller 362 can selectively cause any attached field device to enter sleep mode based upon any logic or rules contained in programming instructions within controller 362 and/or wireless communication received via wireless communication module 366. Preferably, local inputs, such as button 124 are user configurable. Thus a single button could be used to awaken a field device for a user-selectable period of time, and if so configured, depressed again to cause the field device to return to sleep mode. In one embodiment, the configurable local input button uses a jumper or switch to preset the following functions:

Button Depress Time to Activate—select either 1, 1.5, 2 or 3 seconds. Field device ignores button presses having durations shorter than the preset.

Unit On Time—select either 10, 15, 30 seconds, or 5, 15, 30, 60 minutes.

If the button is pressed twice in close succession, the field device stays on for a preset period (for example 60 minutes) after which it returns to sleep mode.

If the button is pressed a second time after a preset interval (for example 5 seconds) the field device will return to sleep mode.

Controller 362 can also preferably cause portions of circuitry within unit 360 or attached field devices to enter sleep mode. For example, wireless communication module 366 may be a commercially available General Packet Radio Service (GPRS) cell phone module, that has both a normal operating mode and a sleep mode. A signal from controller 362 could cause module 366 to enter sleep mode when significant wireless communication is not warranted.

Energy converter 365 can be any device that is able to generate electrical energy for use by the process device. Converter 365 can preferably include a generator (612) coupled to a movable member such that environmental motion, such as waves or wind generate electricity. Further, converter 365 can include fuel cell 408. Further, converter 365 can employ thermopile devices 702 (shown in FIG. 5B) to generate electricity from disparate temperatures using the Peltier Effect. Further still, the process may provide a source of energy in the form of compressed gas or the like, that could be transformed into electricity using compressed gas based generator 704 (shown in FIG. 5B). Finally, in embodiments where the power storage device has a relatively large capacity in comparison to the energy needs of the application, converter 365 may be omitted. It is also expressly contemplated that combinations of the various conversion modules illustrated in FIG. 5B can be employed.

Wireless communication module 366 is coupled to controller 362 and interacts with external wireless devices via antenna 120 based upon commands and/or data from controller 362. Depending upon the application, wireless communication module 366 may be adapted to communicate in accordance with any suitable wireless communication protocol including, but not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology. Further, known data collision technology can be employed such that multiple units can coexist within wireless operating rage of one another. Such collision prevention can include using a number of different radio-frequency channels and/or spread spectrum techniques.

Wireless communication module 366 can also include transducers for a plurality of wireless communication methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Some wireless communications modules may include circuitry that can interact with the Global Positioning System (GPS). GPS can be advantageously employed in unit 360 for mobile devices to allow finding the individual unit 360 in a remote location. However, location sensing based upon other techniques can be used as well.

Memory 370 is illustrated in FIG. 5 as being separate from controller 362, but may, in fact, be part of controller 362. Memory 370 can be any suitable type of memory including volatile memory (such as Random Access Memory), non-volatile memory (such as flash memory, EEPROM memory, etc.) and any combination thereof. Memory 370 may contain program instructions for controller 362 as well as any suitable administrative overhead data for unit 360. Memory 370 may contain a unique identifier for unit 360, such that unit 360 can distinguish wireless communications meant for it among other wireless communications. Examples of such an identifier could include, a Media Access Controller (MAC) address, Electronic Serial Number, global phone number, Internet Protocol (IP) address, or any other suitable identifier. Moreover, memory 370 may include information about attached field devices, such as their unique identifiers, configurations, and abilities. Finally, controller 362, using memory 370 can cause the output of unit 360 to be provided in any suitable form. For example, configuration and interaction with unit 360 and/or one or more associated field devices could be provided as HyperText Markup Language (HTML) web pages.

Clock 372 is illustrated as being coupled to controller 362, but may also be part of controller 362. Clock 372 allows controller 362 to provide enhanced operation. For example, clock 372 can be used to time the periods set forth above with respect to configurable button 125. Additionally, controller 362 can store information from one or more attached field devices, and correlate the information with time in order to recognize trends. Further still, controller 362 can supplement information received from one or more field devices with time information before transmitting it via wireless communication module 366. Further still, clock 372 can be used to automatically generate periodic sleep/awaken commands for unit 360 and/or field devices. Another form of periodic use for clock 372 is to cause controller 362 to issue, via module 366, a heartbeat type signal to periodically indicate an acceptable status to an external wireless device.

Loop communicator 368 is coupled to controller 362 and interfaces controller 362 to one or more field devices coupled to one or more attachment regions 112. Loop communicator 368 is known circuitry that generates appropriate signals in order to communicate in accordance with an industry protocol, such as those set forth above. In embodiments where unit 360 is coupled to a plurality of field devices that communicate in accordance with different protocols, it is conceivable that multiple loop communicators could be used to allow controller 362 to interact with the various field devices. The physical connection(s) made through attachment region 112 allows unit 360 to power and communicate with the field devices. In some embodiments, this can be done by providing power over the same conductors used for communication, such as a two-wire loop. However, it is also contemplated that embodiments of the invention can be practiced where power is provided to the field device on separate conductors than those used for communication. For ease of technician access, unit 360 may include two or more terminals proximate loop communicator 368 or attachment region 112 in order to facilitate the coupling of a handheld configuration device, such as the Model 375 Handheld device available from Rosemount, Inc. of Eden Prairie, Minn.

FIG. 5 also illustrates optional operator button block 374 and LCD display block 376 in phantom being coupled to controller 362. This illustration is intended to show that all local inputs, be they on individual field devices, wireless power and communication unit 360, or both are coupled to controller 362. Additionally, local user displays, on each field device, wireless power and communication unit 360, or both are also coupled to controller 362. This allows controller 362 to interact with each local display individually based upon inputs from the field device, the configurable button associated with the field device, one or more buttons or inputs disposed proximate unit 360, or from wireless communication.

Figure 6:
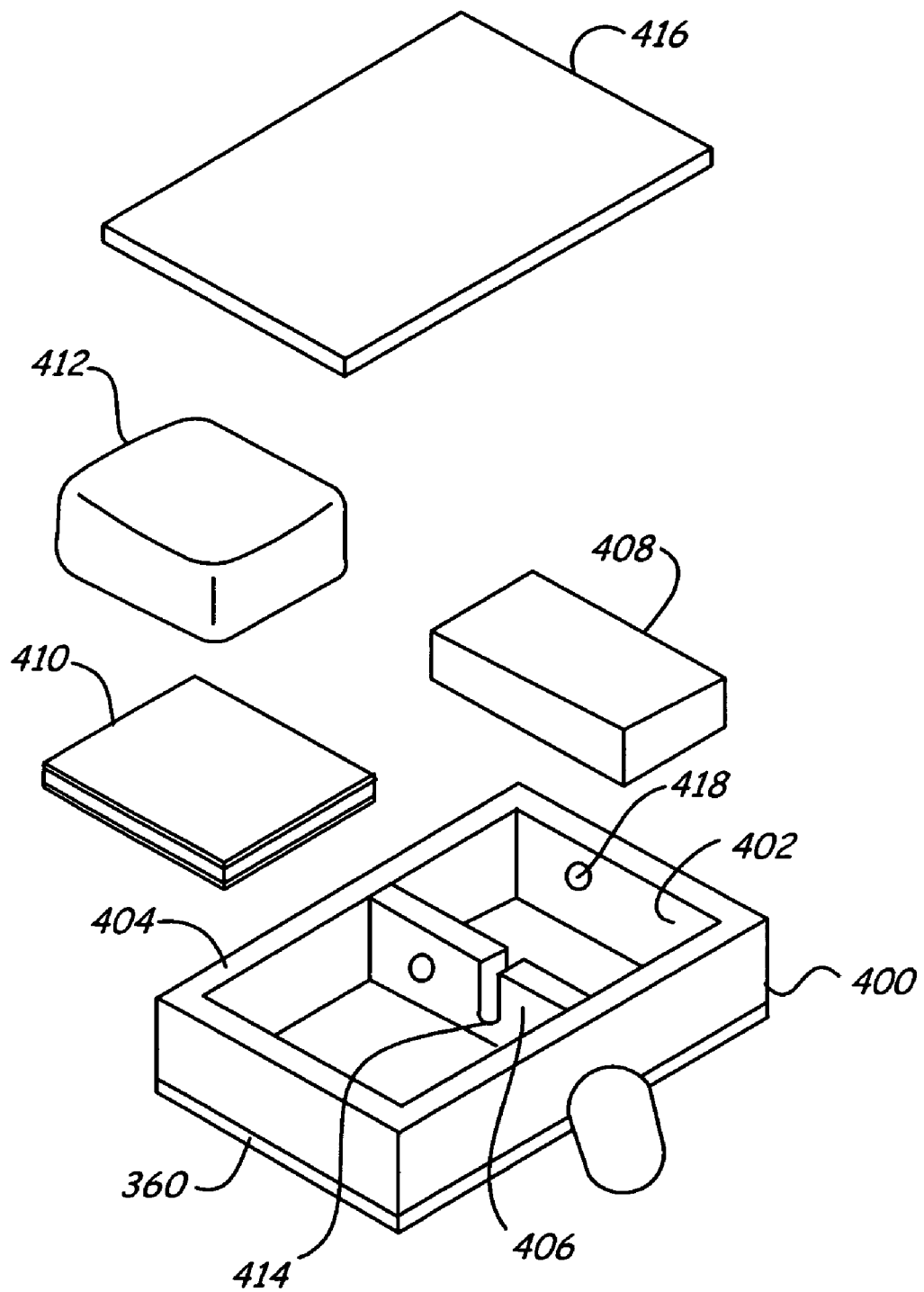
FIG. 6 is a diagrammatic view of an electrical power generation system for a process device in accordance with an embodiment of the present invention.

FIG. 6 is a diagrammatic view of an electrical power generation system for a process device in accordance with an embodiment of the present invention. System 360 is illustrated as being an external module to a process device, but can also be manufactured to be integral with the process device. Module 360 includes housing 400 that is couplable to the process device. Housing 400 includes a pair of compartments 402, 404 that are separated by thermal barrier 406. A small form factor methanol fuel cell 408 is placed in compartment 402. Electronics control and power management system 410 includes a number of power management components and circuits and is disposed in compartment 404. Electronics module 410 may include an ultra high capacity capacitor, and/or battery to handle peak transmission power demands. Additional details regarding the actual circuit employed in module 410 that are provided with respect to FIG. 7. Electronics module 410 is also preferably encapsulated in order to further thermally isolate the electronics in module 410 from the heat generated by the exothermic reaction of fuel cell 408. A source of liquid methane 412 is adapted to be stored in compartment 404 on top of module 410. Liquid methane storage system 412 is couplable to methanol fuel cell 408 via groove 414.

The first fuel cells were based on $H_2+O_2 \rightarrow H_2O+2e^-$. Since $H_2$ is difficult to store and is dangerous to handle, alternate fuel cell strategies were investigated. One attractive fuel cell technology is that based on the methanol fuel cell. Methanol fuel cells are currently known and can be built practically. Methanol is catalytically decomposed into $H_2$+|biproducts|+ |heat. Atmospheric air is used as an oxygen ($O_2$) source. A very significant advantage of this type of fuel cell is its compact size. Small, methanol fuel cells based on micro-electromechanical systems (MEMS) technology can be built that are capable of supplying adequate power for a wireless process variable transmitter. Current state of the art for methanol fuel cells indicates that a device roughly the size of a deck of cards would provide adequate fuel storage and electricity generation for the wireless process variable field device.

Since the catalytic decomposition of methanol generates heat, cell 408 is separated thermally from electronics 410 and liquid storage tank 412. Additionally, a heat dissipating cover 416 is disposed on top of housing 400 to release heat generated by cell 408. It is important to ensure that the heat generated by the catalytic decomposition of methanol is dissipated and prevented from heating electronics 410 beyond their safe operating temperature. In embodiments where the power system housing 400 is made of metal, this generated heat is dissipated by both convection and radiation. Additionally, thermal barrier 406 helps protect electronics 410. Housing 400 also includes a vent 418 to allow atmospheric oxygen to interact with cell 408. In embodiments where venting may be objectionable, a miniature fan in a small, sealed duct can be provided as an alternative embodiment.

Figure 7:
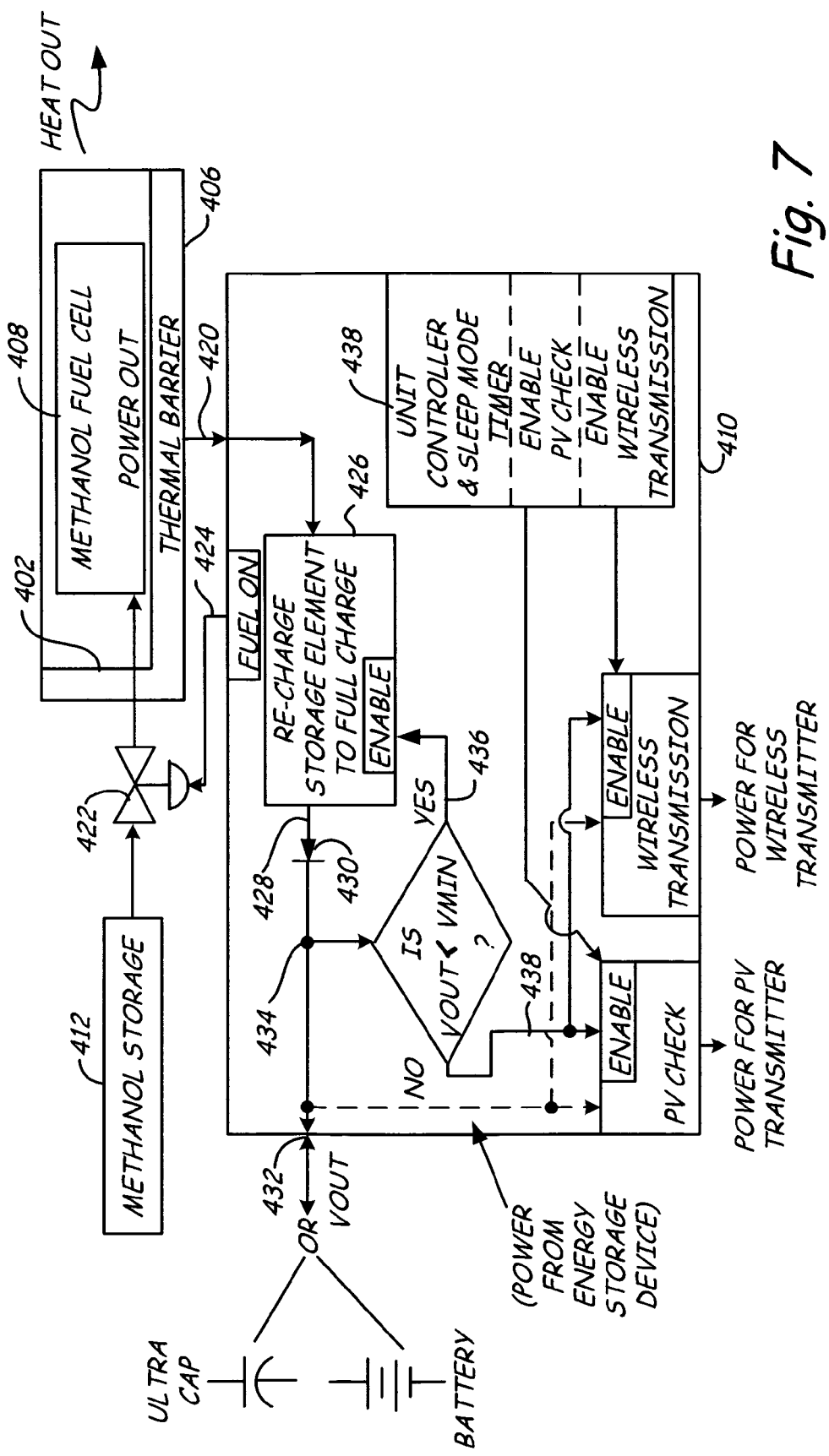
FIG. 7 is a diagrammatic view of a power generation system for process devices in accordance with an embodiment of the present invention.

FIG. 7 is a diagrammatic view of the power generation system for process devices in accordance with an embodiment of the present invention. Electronics module 410 is electrically coupled to methanol fuel cell 408 and receives power therefrom via line 420. Methanol based fuel cell is disposed within compartment 402 that is thermally isolated from electronics module 410 via thermal barrier 406. Methanol storage 412 is coupled to methanol fuel cell 408 via electrically controlled valve 422. Valve 422 receives its control signal from a fuel-on output line 424 from module 410. Electricity generated in fuel cell 408 is provided through line 420 to charge and control circuit 426. Charge and control circuit 426 provides an output 428 through diode 430 that is arranged to ensure that energy does not flow back thorough fuel cell 408. If an additional energy storage unit is provided, it is coupled to $V_{out}$ line 432. The voltage at node 434 is compared, using preferably a comparator, with a minimum threshold voltage. If the voltage at node 434 is less than the minimum threshold voltage, then charging is enabled via line 436. If, however, the voltage at node 434 is greater than the minimum threshold, then a signal is provided along line 438 to enable power for the process variable transmitter as well as power for the wireless communicator. Accordingly, if insufficient power is available from the methanol based fuel cell to run the process variable transmitter and/or the wireless transmitter, then the power circuit focuses upon storing enough energy to run either the process variable transmitter or the wireless communicator at some later time. FIG. 7 also illustrates a unit controller and sleep mode timer 438 that generates an enable signal sent to the process variable transmitter and the wireless communicator. Thus, unit controller and sleep mode timer 438 can cause the process variable transmitter, the wireless communicator, or both, to enter a sleep mode where one or both devices draw extremely low power, while fuel cell 408 may be charging the energy storage device. Accordingly, the power storage elements are recharged by the methanol fuel cell when their output voltage decreases below a predetermined value ($V_{min}$) to ensure successful operation, power for either the process variable check, or the wireless transmission is provided only if the power storage element is not in a discharged state. The predetermined voltage level ($V_{min}$) is selected so that at any voltage above this level, the energy stored will be sufficient for a complete process variable check, or wireless transmission. Before additional process variable checks or wireless transmissions are initiated, the voltage is preferably rechecked to verify that it is still above the threshold. Electronics 410 may perform other control and communication activities as may be desired.

One clear advantage of the methanol fuel cell as a process device power source is the service intervals that it provides. It is estimated that methanol fuel cells produce approximately 1,000 watt-hours per liter of methanol. Accordingly, a wireless process variable transmitter would operate about 10 years on one-half liter of methanol. A 10 year service interval compares very favorably with the 5 years expected shelf/best-service life of gel cell batteries which are now the untethered power source standard for wireless process devices.

One synergy created by providing the energy storage device, such as a battery or super capacitor in the same physical housing as the fuel cell, is that heat generated by the fuel cell can be used to help keep the energy storage device in a more efficient temperature operating range. In embodiments where rechargeable batteries are used to cover peak energy demands, nickel metal hydride (NiMH) batteries can be used in outdoor applications in conjunction with methanol fuel cells. This is because methanol fuel cells generate heat which can be used to keep the batteries' temperature high enough for charging.

While the embodiments illustrated with respect to FIGS. 4-8 show an antenna and associated wireless circuitry co-located with the power management circuitry, it is expressly contemplated that the antenna and wireless circuitry could be located remotely if objects causing wireless signal interference are near the power system housing. Thus, embodiments of the present invention include the provision of all power generation and wireless circuits within the same housing, which may be a housing that is part of, or external to the process device. Additionally, either the power generation circuitry or the wireless circuitry could be located in separate compartments, either one of which could be within the actual process device itself.

Figure 8:
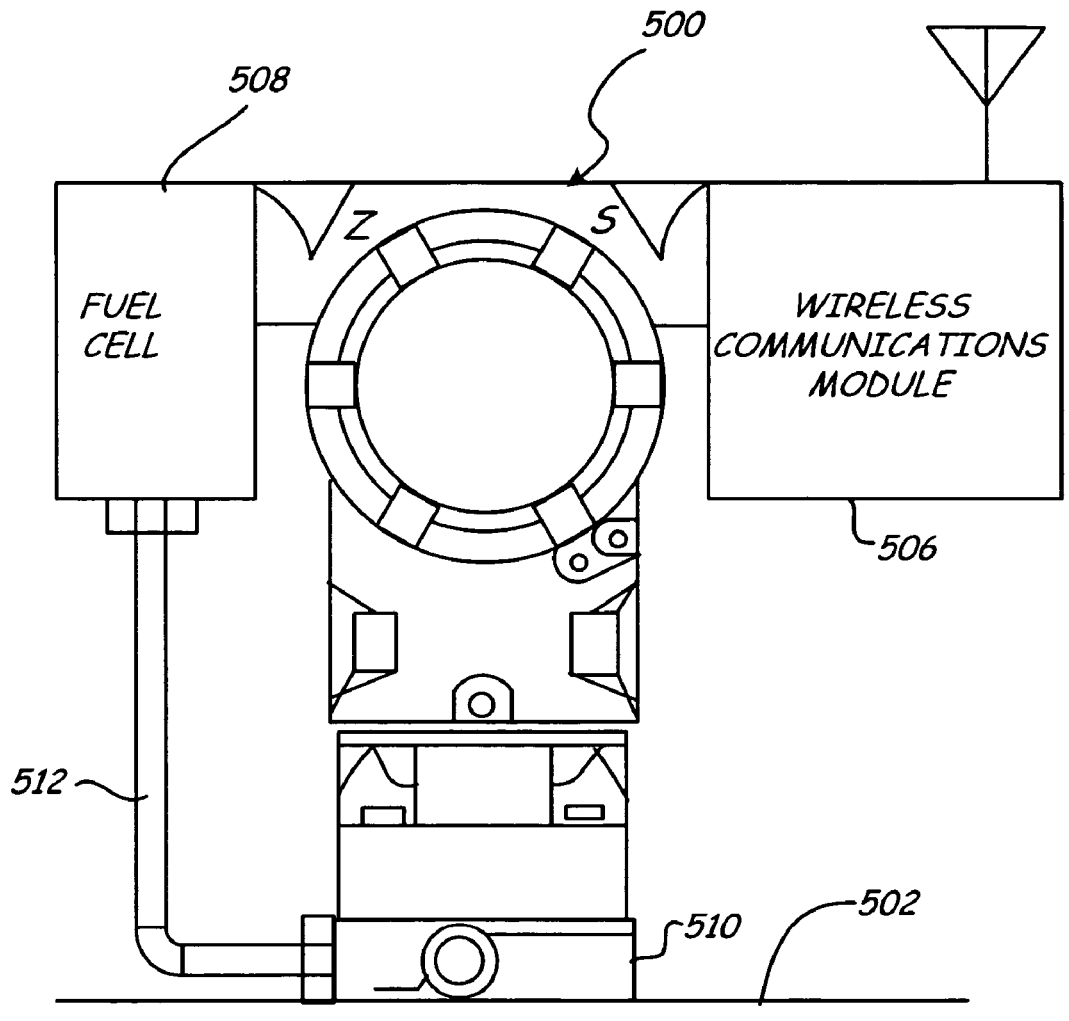
FIG. 8 is a diagrammatic view of a wireless process device in accordance with an embodiment of the present invention.

FIG. 8 is a diagrammatic view of a wireless process device in accordance with an embodiment of the present invention. Process device 500 is coupled to conduit 502 having a hydrocarbon-based process fluid 504 therein. Device 500 is coupled to wireless communication module 506 and fuel cell module 508. Unlike the embodiment described with respect to FIGS. 6 and 7, fuel cell 508 does not include a fuel cell storage tank. Instead, fuel cell 508 draws its fuel from the process itself by virtue of coupling to the process via manifold 510. Thus, some of process fluid 504 is conveyed to fuel cell 508 via conduit 512. In order to increase efficiency, fuel cell 508 is preferably designed to function with the anticipated type of hydrocarbon based process fluid. For example, if process fluid 504 is liquid methanol, then 508 can be identical to fuel cell 408 described with respect to FIG. 6. Though this embodiment differs from the previous embodiment, they are similar in the sense that both embodiments make use of non-solar molecules external to the process device proximate the process device in order to power the device. The embodiment of FIGS. 6 and 7 uses at least molecules of oxygen while the embodiment with respect to FIG. 8 uses at least molecules of process fluid, and likely molecules of oxygen as well, in accordance with known fuel cell technologies.

By relying upon the process fluid itself in order to power fuel cell 508, a virtually infinite source of energy is available from the process. Accordingly, electricity can also be provided to other local devices that may be coupled to device 500 via wired connections. Such wired connections may take the form of process control loops, or any other suitable wiring arrangements as may be desired. In some situations, the process device is designed such that the process fluid is converted to electrical power at a rate that is proportional to the amount of process fluid flowing in conduit 502. Thus, the electrical output of fuel cell 508 could be measured and corrected to reflect the actual flow of process fluid in pipe 502. Yet another important application of the significant power generation abilities of fuel cell 508 is to electrically power heaters to maintain a sensor at a fixed temperature to minimize temperature errors for custody transfer applications and alike.

FIGS. 9A, 9B, 10A, and 10B illustrate embodiments of the present invention that make use of molecules proximate the process device in order to generate electricity for the process device. More particularly, these embodiments convert kinetic energy of molecules (in the form of wind) into electrical energy.

Figure 9A:
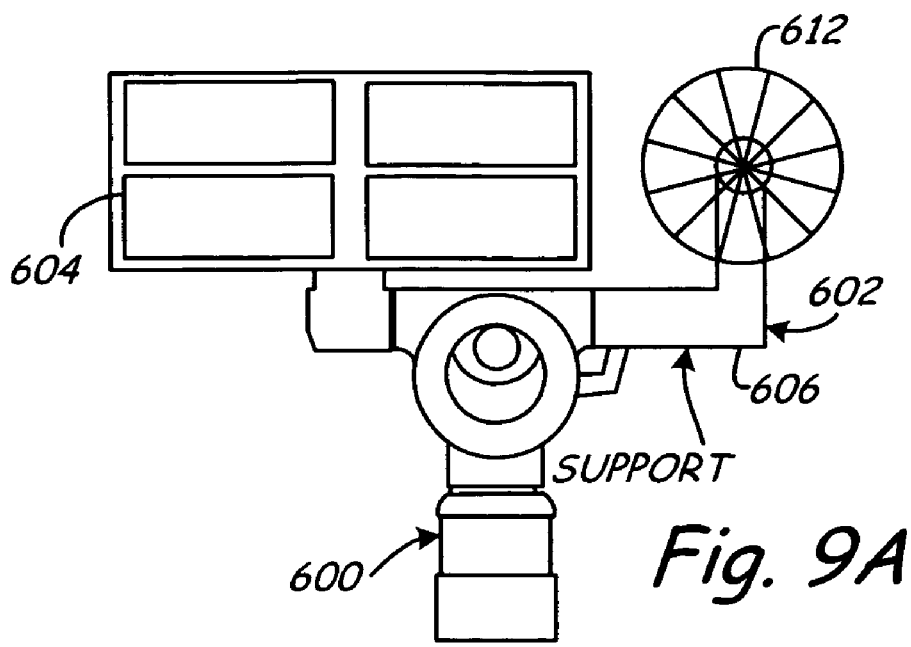
FIGS. 9A and 9B are front and side elevation views, respectively, of a process device in accordance with an embodiment of the present invention.
Figure 9B:
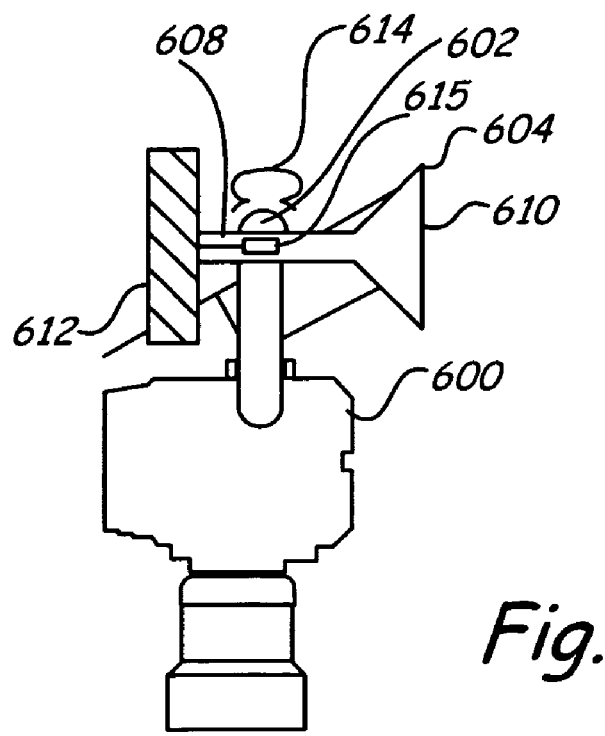

FIGS. 9A and 9B are front and side elevation views, respectively, of a process device 600 in view with an apparatus 602 that converts wind energy to electrical energy. It is preferred, that these wind energy embodiments also include solar energy conversion system 604 for supplemental energy. Wind converter 602 includes a support 606 mounted to process device 600 preferably via a traditional conduit coupling. Mounted to top support 606, wind moveable element 608 preferably includes at least two parts. First, wind vane 610 is adapted to present a surface area such that wind will cause vane 610 to be positioned down stream thus positioning propeller/impeller portion 612 directly into the wind. Accordingly, movable portion 608 can swivel about support 606 as indicated by arrows 614. Rotatable impeller/propeller 612 is mechanically coupled to an electrical generator 615 that provides electrical energy to process device 600. The electrical generator can be any suitable device known in the art, or later developed.

Figure 10A:
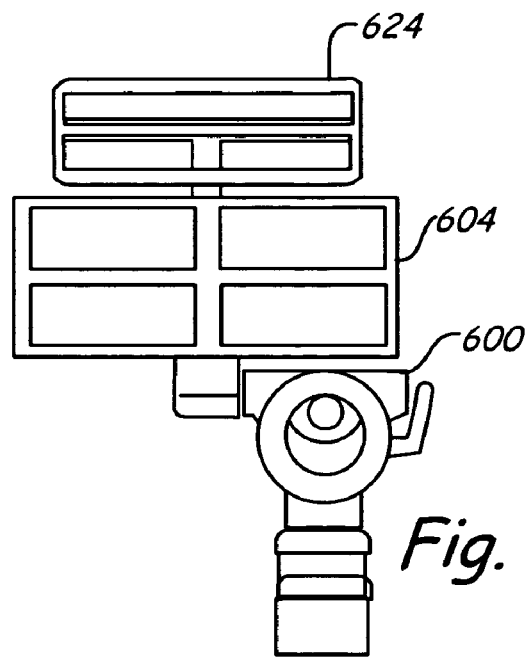
FIGS. 10A and 10B are front and side elevation views, respectively, of a process device in accordance with another embodiment of the present invention.
Figure 10B:
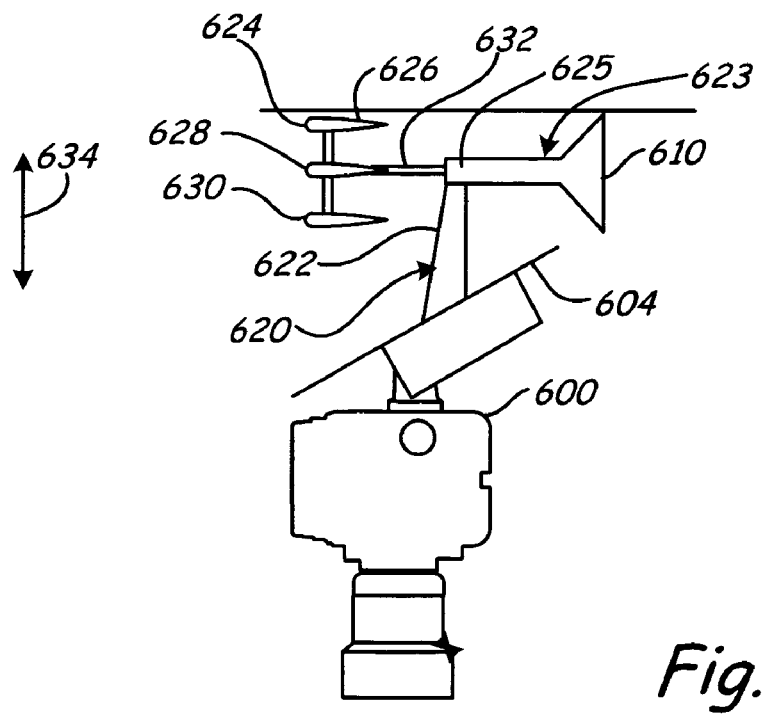

FIGS. 10A and 10B are front and side elevation views, respectively, of process device 600 coupled to a wind-to-electricity converter 620 in accordance with another embodiment of the present invention. Converter 620 includes support 622 mounted proximate supplemental solar energy converter 604. Wind movable member 623 includes a wind vane 610 and wind displaceable members 624, 628, and 630 coupled to support 622 via beam 632. As before, wind pressure acting upon vane 610 will cause member 624 to rotate about support 622 thereby placing airfoils 624, 628, and 630 directly into the wind. As wind passes airfoils 624, 628, and 630, such airfoils will cause displacement in the direction indicated by arrows 634 along beam 632. A piezoelectric transducer 655 positioned on beam 632, or at the junction of beam 632 with support 622 transforms the displacement of beam 632 into electrical energy which is then conveyed to process device 600.

Both embodiment shown with respect to FIGS. 9A, 9B, and 10A, 10B could also be provided with a shroud or cover that will help provide protection against fouling in severe applications.

Other types of rotating wind energy converters may be employed, such as an anemometer like embodiment. This is a rotating cup device that is often used to measure wind speed. While such devices are significantly less efficient than a propeller in extracting energy from wind, they do offer the advantage of being on the directional. Thus, the use of a rotatable wind vane is not required. Since the energy demands of process devices are relatively low, the lower efficiency of such omni directional rotating wind energy converters is not problematic.

Embodiments of the present invention make use of additional sources of potential or kinetic energy available in molecules proximate the process device. Accordingly, such embodiments do not require solar energy, nor do they have the drawbacks of process devices powered solely with internal batteries. Moreover, as described with respect to some embodiments, the degree of energy generation can be so great that other process devices may be wired to and powered by the process device operating in accordance with the embodiments of the present invention.

Although the present invention has been described with reference to preferred embodiments, workers skilled in the art will recognize that changes may be made in form and detail without departing from the spirit and scope of the invention.

What is claimed is:

1. A system comprising:
    a field device coupled to a conduit having a hydrocarbon-based process fluid therein wherein the field device senses an aspect of the hydrocarbon-based process fluid, the unit comprising; and
    a wireless power communication for providing wireless operation to the field device, the unit comprising:
        a housing;
        an attachment region coupled to the housing and being coupled to the field device;
        a power generation module including a hydrocarbon-based fuel cell operably coupled to the conduit to receive the hydrocarbon-based process fluid to provide electricity to the field device;
        a loop communicator connected to the field device via the attachment region and configured to communicate digitally with the field device;
        a controller coupled to the power source and loop communicator, the controller being configured to interact with the field device using the loop communicator; and
        a wireless communication module coupled to the controller and being configured for wireless communication.

2. The system of claim 1, wherein the fuel cell is a methanol fuel cell.

3. The system of claim 1, and further comprising a storage tank coupled to the fuel cell to provide a stored source of fuel to the fuel cell.

4. The system of claim 3, wherein the fuel cell, the storage tank, and the controller are disposed within the housing, and wherein the housing includes a thermal barrier that thermally isolates the fuel cell from the storage tank and the controller.

5. The system of claim 1, wherein the wireless power and communication unit includes a controller disposed within the housing, the controller being configured to actively manage power for itself and the field device.

6. The system of claim 5, wherein actively managing power includes causing at least one of the controller and the field device to enter a sleep mode.

7. The system of claim 6, wherein the sleep mode results from commanding the field device to set its operating current at its lowest allowable current rail.

8. The system of claim 6, wherein the controller generates a sleep mode command based upon the occurrence of an event.

9. The system of claim 8, wherein the event includes an event selected from the group consisting of the expiration of an activity period, and input from a local user input, communication from an attached field device, and wireless communication.

* * * * *

UNITED STATES PATENT AND TRADEMARK OFFICE
CERTIFICATE OF CORRECTION

| | | |
|---|---|---|
| PATENT NO. | : 8,145,180 B2 | Page 1 of 1 |
| APPLICATION NO. | : 11/236317 | |
| DATED | : March 27, 2012 | |
| INVENTOR(S) | : Gregory C. Brown et al. | |

It is certified that error appears in the above-identified patent and that said Letters Patent is hereby corrected as shown below:

Claims

Col. 11, lines 29-30, Claim 1, please delete:
", the unit comprising".

Col. 11, line 31, Claim 1, please insert:
--unit-- after "communication".

Signed and Sealed this
Twenty-third Day of February, 2016

Michelle K. Lee
*Director of the United States Patent and Trademark Office*